(12) United States Patent
Myers et al.

(10) Patent No.: US 12,184,100 B1
(45) Date of Patent: Dec. 31, 2024

(54) HYBRID POWER SYSTEM WITH POWER OPTIMIZATION AND METHODS OF USE

(71) Applicant: M4CL Productions, LLC, Gainesville, FL (US)

(72) Inventors: Charles Myers, Gainesville, FL (US); Dennis Lukso, Tucson, AZ (US)

(73) Assignee: M4CL Productions, LLC, Gainesville, FL (US)

( * ) Notice: Subject to any disclaimer, the term of this patent is extended or adjusted under 35 U.S.C. 154(b) by 0 days.

(21) Appl. No.: 18/389,473

(22) Filed: Nov. 14, 2023

(51) Int. Cl.
*H02J 7/00* (2006.01)
*H02J 7/34* (2006.01)

(52) U.S. Cl.
CPC .......... *H02J 7/0014* (2013.01); *H02J 7/0048* (2020.01); *H02J 7/345* (2013.01)

(58) Field of Classification Search
CPC .................................................. H02J 7/0014
USPC ....................................................... 320/128
See application file for complete search history.

(56) References Cited

U.S. PATENT DOCUMENTS

| | | | |
|---|---|---|---|
| 8,193,761 B1 * | 6/2012 | Singh | B60L 50/40 307/64 |
| 10,910,606 B2 | 2/2021 | Crowley | |
| 2006/0197382 A1 * | 9/2006 | Chou | H02J 9/061 320/160 |
| 2008/0211230 A1 * | 9/2008 | Gurin | B60W 10/30 290/2 |
| 2010/0244573 A1 * | 9/2010 | Karnick | H02J 7/34 307/80 |
| 2018/0167028 A1 * | 6/2018 | Agarwal | H02S 40/38 |
| 2018/0198290 A1 * | 7/2018 | Rohera | H02J 7/0014 |
| 2021/0031652 A1 | 2/2021 | De Brito | |
| 2023/0216330 A1 | 7/2023 | Cronin | |

* cited by examiner

*Primary Examiner* — Yalkew Fantu
(74) *Attorney, Agent, or Firm* — Caldwell Intellectual Property Law

(57) ABSTRACT

A hybrid power system, comprising at least two power storage components, each power storage component comprising a power source having a corresponding source profile and a source charger electrically connected to the power source, and a power path controller operatively connected to the at least two power storage components, comprises a processing circuit configured to receive an input signal and selectively switch between the source profiles correspond to the power sources of the at least two power storage components based on the received input signal, thereby configuring at least one power storage component of the at least two power storage components to provide stored power to an external load.

18 Claims, 8 Drawing Sheets

HYBRID POWER SYSTEM WITH POWER OPTIMIZATION AND METHODS OF USE

FIELD OF THE INVENTION

The present invention generally relates to the field of energy management. In particular, the present invention is directed to a hybrid power system and methods of use.

BACKGROUND

For electrical vehicles where energy demands can fluctuate rapidly due to varying terrains and driving conditions, conventional power management systems may struggle to dynamically optimize power source utilization.

SUMMARY OF THE DISCLOSURE

In an aspect, a hybrid power system is described. The hybrid power system includes at least two power storage components, wherein each power storage component includes a power source having a corresponding source profile and a source charger electrically connected to the power source. The hybrid power system further includes at least one power path controller operatively connected to the at least two power storage components, wherein the at least one power path controller includes a processing circuit configured to receive an input signal and selectively switch between the source profiles correspond to the power sources of the at least two power storage components based on the received input signal, thereby configuring at least one power storage component of the at least two power storage components to provide stored power to an external load.

In another aspect, a method of use of a hybrid power system is described. The method includes connecting at least one power path controller to at least two power storage components, wherein each power storage component includes a power source having a corresponding source profile and a source charger electrically connected to the power source. The method further includes receiving, by a processing circuit of the at least one power path controller, an input signal, selectively switching, by the processing circuit, between the source profiles correspond to the power sources of the at least two power storage components based on the received input signal, and configuring, by the processing circuit, at least one power storage component of the at least two power storage components to provide stored power to an external load.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for efficiently managing and optimizing power distribution among multiple power storage components in a hybrid battery system. In an embodiment, the system employs a power path controller and sensing modules to dynamically select the most appropriate power source based on real-time demands and conditions.

Aspects of the present disclosure can be used to enhance the longevity and performance of individual power storage components by ensuring they operate within optimal parameters. Aspects of the present disclosure can also be used to improve the overall efficiency of the system, leading to longer operational times and reduced energy wastage. This is so, at least in part, because the system may be configured to adapt to changing conditions, reducing strain on individual components, and ensuring optimal energy utilization.

Aspects of the present disclosure allow for a more sustainable and reliable energy solution, especially in dynamic applications like electric vehicles or renewable energy storage systems. Exemplary embodiments illustrating aspects of the present disclosure are described below in the context of several specific examples.

Figure 1:
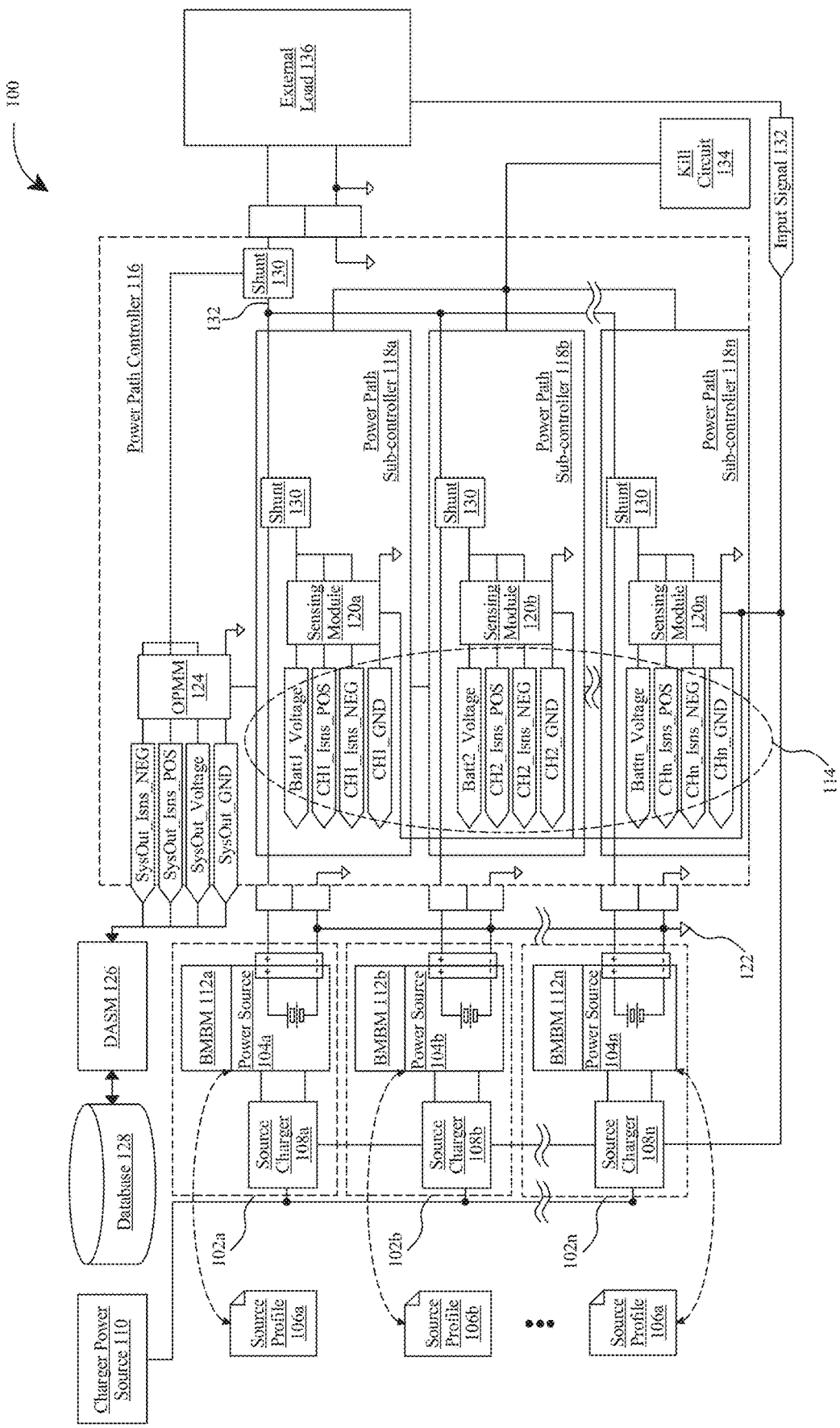
FIG. 1 is an exemplary embodiment of a hybrid power system.

Now referring to FIG. 1, an exemplary circuitry of the hybrid power system 100 is illustrated. As used in this disclosure, a "hybrid power system" refers to an integrated energy management system that incorporates multiple power storage components for the purpose of supplying energy to an external load, as described in detail below. In an embodiment, hybrid power system 100 may include at least two power storage components 102*a-n*. In another embodiment, hybrid power system 100 may include more than two power storage components. As a non-limiting example, as shown in FIG. 1, hybrid power system 100 may include three power storage components, each may be selected from a variety of energy storage technologies as described herein.

With continued reference to FIG. 1, a "power storage component," for the purpose of this disclosure, is a unit or module within hybrid power system 100 that is designed to store energy and release it when required. In an embodiment, power storage component may be an integral part of hybrid power system 100, configured to store and manage energy, ensuring that the said system may provide consistent and reliable power supply 24/7, especially during periods when primary energy sources may be insufficient or unavailable.

Still referring to FIG. 1, each power storage component of at least two power storage components 102a-n may include a power source 104 having a corresponding source profile 106. As used in this disclosure, a "power source" is a primary unit within power storage component that holds the energy. The nature and type of power source 104 may be vary, and it may be characterized by its corresponding source profile 106. The "source profile," as described herein, refers to a set of characteristics, specifications, or performance metrics associated with power source 104 within power storage component as described herein. In some cases, source profile 106 may include, without limitation, a comprehensive overview of corresponding power source's capabilities, limitations, and operational parameters. In a non-limiting example, power source may include a battery pack, wherein the battery pack may include a plurality of battery cells, as described in detail below.

With continued reference to FIG. 1, in an embodiment, source profile 106 may include a plurality of inherent properties of corresponding power source 104. As used in this disclosure, "inherent properties" refer to intrinsic characteristics or attributes that define limitations of corresponding power source 104. Plurality of inherent properties may be defined by one or more physical and/or chemical composition, design, construction of power source 104, among others. In some cases, plurality of inherent properties may include a plurality of electrical characteristics such as, without limitation, capacity, voltage (rate), charge (rate), efficiency, lifespan, and/or the like. Exemplary inherent properties are described in detail below.

With continued reference to FIG. 1, in a non-limiting example, source profile 106 may include one or more profile elements describing the capacity of corresponding power source 104, for example, and without limitation, total amount of energy the power source may store (usually measured in watt-hours [Wh] for batteries or joules [j] for other energy storage devices.) In another non-limiting example, source profile 106 may include one or more profile elements describing the voltage (rate) of corresponding power source 104. As a non-limiting example, source profile 106 may include required input voltage, expect output voltage, average voltage level, operational voltage at which power source 104 functions optimally, among others. In yet another non-limiting example, source profile 106 may include one or more profile elements related to charge (rate) of corresponding power source 104. For instance, and without limitation, source profile 106 may detail maximum and/or minimum charge rates, the optimal charge rate for maximizing battery lifespan, average charge rate, charge rate under various temperature conditions and/or the like. In yet another non-limiting example, source profile 106 may include one or more profile elements describing efficiency, the ratio of the energy output to the energy input, indicating how effectively the corresponding power source 104 may store and release energy without significant losses. For example, and without limitation, source profile 106 may incorporate information related to energy conversion efficiency at various charge and discharge rates, efficiency peaks or troughs across operational range of corresponding power source 104, power source standby efficiency, energy lost, and/or the like. In a further non-limiting example, source profile 106 may include one or more profile elements related to the lifespan of corresponding power source 104, e.g., expected operational life or corresponding power source 104 (often measure in charge/discharge cycles or years). In a non-limiting example, source profile 106 for a lithium-ion battery may specify an expected operational life of 1,000 charge/discharge cycles before the battery's capacity diminishes to 80% of its original capacity.

With continued reference to FIG. 1, in another embodiment, source profile 106 may include at least one corresponding behavioral trait. As used in this disclosure, a "behavioral trait" is an observable and predictable responses or actions of power source under various conditions or stimuli. In some cases, behavioral trait within source profile 106, unlike inherent properties as described above, may be influenced by external factors and/or may vary based on different operating environment, usage patterns of system 100, and/or the like. In a non-limiting example, source profile 106 may include one or more profile elements related to response to load variations i.e., how corresponding power source 104 may reacts to a sudden increase or decreases (e.g., voltage sag or surge) caused by changes in external load demand during transition between different power storage components as described in detail below. For instance, lithium-ion battery may exhibit a brief voltage drop when transitioning from a low-demand state to a high-demand stage before stabilizing.

With continued reference to FIG. 1, other exemplary behavioral traits may include, without limitation, charging behaviors (i.e., the manner in which corresponding power source 104 accepts energy during the charging process, including charging efficiency, heat generation, and response to different charging rates), discharge curve (i.e., pattern of voltage decline as corresponding power source 104 discharges that infer energy delivery consistency), thermal behavior (i.e., how corresponding power source 104 manages heat during operation, including its tendency to overheat under certain conditions, cooling efficiency, and the like), self-discharge rate (i.e., rate at which corresponding power source 104 loses its stored energy when not in use by system 100), recovery time (i.e., a time taken by corresponding power source 104 to return to an optimal state after a high-load event or other stress conditions), degradation pattern (i.e., the manner in which corresponding power source's 104 performance diminishes over time, including capacity fade, increase in internal resistance, and the like), safety responses to potentially hazardous situations (e.g., overcharging, short-circuiting, or thermal runaway, and the like, including activation of safety mechanisms), performance adjustments based on external factors (e.g., ambient temperature or altitude), interactions with other system components as described in detail below.

With continued reference to FIG. 1, in other embodiments, source profile 106 may include one or more profile elements described physical dimensions (e.g., the size and weight of corresponding power source 104) and compatibility (i.e., information about which charges, devices, or systems corresponding power source 104 may be compatible with). In a non-limiting example, source profile 106 for a lithium-ion battery may specify dimensions of 150 mm×65 mm×23 mm with a weight of 300 grams, indicating its suitability for compact devices. Continuing the non-limiting example, source profile 106 may further detail that the lithium-ion battery may be compatible with certain source charger as described in detail below. As an ordinary person skilled in the art, upon reviewing the entirety of this disclosure, will be aware of various inherent properties and behavioral traits within source profile associated with the described power sources.

With continued reference to FIG. 1, each power storage component of at least two power storage components 102a-n may each include a source charger 108 electrically connected to power source 104. As described in this disclosure, a "source charger" is an electrical device connected to power source 104, configured to transfer energy from a charger power source 110 into connected power source 104, ensuring it is charged and ready for use. In an embodiment, source charger 108 may be configured to replenish stored energy in connected power source 104 from charger power source 110 as described in detail below. In some cases, source charger 108 may be configured to ensure connected power source 104 receives desired (or correct) voltage, current, charging profile to (safely and/or efficiently) restore power capacity based on corresponding source profile 106 of the connected power source 104. In a non-limiting example, source charger may include a portable power bank, a generator, a battery charger, a device charger, a power transmitter, and or any other interruptible or uninterruptible power supplies.

With continued reference to FIG. 1, a "charger power source," for the purpose of this disclosure, refers to a primary energy supply that provides electrical energy to a charger e.g., source charger 108, enabling the charger to replenish the energy of a secondary device e.g., corresponding power storage component, in particular, the power source, such as a battery or capacitor as described in detail below. In a non-limiting example, charger power source 110 may include mains electricity (AC power) supply. For instance, source charges 108 of at least two power storage components 102*a-n* may be plugged into one or more wall outlets. In another non-limiting example, charger power source 110 may include one or more direct current (DC) sources that provide a steady flow of electricity in one direction, e.g., an electric vehicle fast-charging station. In yet another non-limiting example, charger power source 110 may include one or more solar panels configured to convert sunlight into electrical energy, which may then be used to charge power sources directly or indirectly within at least two power storage components 102*a-n* for later use. In a further non-limiting example, charger power source 110 may include one or more generators (powered by gasoline, diesel, or other fuels) that convert mechanical energy into electrical energy. Other exemplary embodiments of charger power source 110 may include, without limitation, wind turbines, thermal energy converters, kinetic energy harvesters, among others. As an ordinary person skilled in the art, upon reviewing the entirety of this disclosure, will be aware of various source chargers and charger power source may be employed by hybrid power system 100.

With continued reference to FIG. 1, in a non-limiting example, power storage components 102*a-n* described herein may include a plurality of battery-based power storage components, wherein power source of each battery-based power storage component of the plurality of battery-based power storage components may include a (rechargeable) battery, such as, without limitation, lithium-ion, lead-acid, or nickel-metal hydride battery. In some cases, hybrid power system 100 may include three power storage components, wherein power source of a first power storage component including a lithium-ion battery, a second power storage component including a lithium-titanate battery, and a third power storage component including a supercapacitor.

Still referring to FIG. 1, lithium-ion phosphate battery may include lithium iron phosphate (LiFePO$_4$) as cathode material, graphite as anode material, and a lithium salt in an organic solvent as electrolyte. In some cases, lithium-ion phosphate may have safer thermal and chemical stability compared to other lithium-ion chemistries. Lithium-ion phosphate battery may be associated with profile elements related to one or more factors including, without limitation, "low cost," "high safety," "low toxicity," "long cycle life," and/or the like. Additionally, or alternatively, lithium-ion phosphate battery may be considered more environmentally friendly than other lithium-ion batteries due to the absence of heavy metals and their inherent safety features. Source Profile associated with lithium-ion phosphate battery is described in detail below.

Still referring to FIG. 1, lithium-ion phosphate battery may include a nominal voltage around 3.2V to 3.3V per cell. Lithium-ion phosphate battery may include a charge cut-off voltage around 3.65V per cell. Lithium-ion phosphate battery may include a discharge cut-off voltage around 2.5V per cell.

Still referring to FIG. 1, lithium-ion phosphate battery may include specific energy density (Wh/kg) ranges from 90 to 120 Wh/kg. Lithium-ion phosphate battery may include energy density (Wh/L) ranges from 250 to 330 Wh/L.

Still referring to FIG. 1, lithium-ion phosphate battery may achieve over 2,000 charge/discharge cycles before reaching 80% of the original capacity of the battery. In some cases, lithium-ion phosphate battery may reach up to 10,000 charge/discharge cycles with high-quality cells.

Still referring to FIG. 1, lithium-ion phosphate battery may include an operating temperature ranges from −20° C. to 60° C., with optimal performance between 0° C. and 45° C. Lithium-ion phosphate battery may include a storage temperature ranges from −40° C. to 60° C., with reduced degradation when stored at cooler temperatures.

Still referring to FIG. 1, lithium-ion phosphate battery may include a standard charge rate at 0.5C~1C. Lithium-ion phosphate battery may include a fast charge rate up to 3C for partial cells. Lithium-ion phosphate battery may include a maximum discharge rate up to 3C with some high-performance cells allowing for higher discharge rates. In some cases, lithium-ion phosphate battery may include a self-discharge rate of less than 3%/month.

Still referring to FIG. 1, lithium-ion phosphate battery may have a higher thermal stability compared to other lithium-ion chemistries, reducing the risk of thermal runaway. Lithium-ion phosphate battery may include a better tolerance to overcharging conditions without compromising safety compared to other batteries as described herein.

Still referring to FIG. 1, lithium-ion phosphate battery may include an internal resistance that varies based on specific design and size of the cell. In some cases, internal resistance of lithium-ion phosphate battery may range from 10 mΩ to 50 mΩ.

With continued reference to FIG. 1, first power storage component having lithium-ion phosphate battery as described herein may include a source charger e.g., a CC/CV (constant current/constant voltage) charger configured to applies a constant current (up to 1C) until lithium-ion phosphate battery reaches its peak voltage (round 3.65V per cell). In some cases, source charger may be configured to switch to a constant voltage mode after reaching the peak voltage, to maintain 3.65V while gradually decreasing the current until lithium-ion phosphate battery is fully charged. Source charger for lithium-ion phosphate battery may be terminated upon receiving a request signal from power path controller as described below and/or when current drops to a set value (3~5% of the rated capacity [0.03~0.05]).

Still referring to FIG. 1, source charger for lithium-ion phosphate battery may include a peak voltage around 3.65V per cell and/or a (lower) float voltage around 3.3V to 3.4V after lithium-ion phosphate battery is fully charged to maintain the state of charge. In some cases, charging current of such source charger may be around 0.5C to 1C. Charging at 3C may reduce lithium-ion phosphate battery's lifespan. Charger power source for the described source charger of lithium-ion phosphate battery may include any charger power source as described above, for example, and without limitation, a direct current (CD) power source with DC-to-DC converters may be used to charge the lithium-ion phosphate battery.

With continued reference to FIG. 1, lithium-titanate battery within second power storage component, on the other hand, may include Lithium titanate ($Li_4Ti_5O_{12}$) as anode material, lithium manganese oxide ($LiMn_2O_4$) or lithium iron phosphate as cathode material. Electrolyte of the lithium-titanate battery may include a lithium salt in an organic solvent. Lithium-titanate battery may be associated with profile elements related to one or more factors including, without limitation, "exceptional cycle life," "rapid charge/discharge," "enhanced safety," and/or the like. Source Profile associated with lithium-titanate battery is described in detail below.

Still referring to FIG. 1, lithium-titanate battery may include a nominal voltage around 2.4 per cell. Lithium-titanate battery may include a charge cut-off voltage around 2.85V per cell. Lithium-titanate battery may include a discharge cut-off voltage around 1.5V per cell.

Still referring to FIG. 1, lithium-titanate battery may include a much lower energy density compared to lithium-ion phosphate battery as described above. Lithium-titanate battery may include a specific energy density (Wh/kg) ranging from 50 to 80 Wh/kg. Lithium-titanate battery may include energy density (Wh/L) ranges from 100 to 150 Wh/L.

Still referring to FIG. 1, lithium-titanate battery may achieve over 10,000 charge/discharge cycles with come cells even reaching up to 20,000 charge/discharge cycles or more. Lithium-titanate battery may include an operating temperature range from −30° C. to 75° C., with optimal performance between −10° C. and 60° C. Lithium-titanate battery may include a storage temperature ranges from −40° C. to 60° C.

Still referring to FIG. 1, lithium-titanate battery may include a standard charge rate at 1C. Lithium-titanate battery may include a fast charge rate up to 10C or even higher for some specialized cells. Lithium-titanate battery may include a maximum discharge rate up to 10C with some high-performance cells allowing for even higher discharge rates. In some cases, lithium-titanate battery may include a self-discharge rate of less than 3%/month.

Still referring to FIG. 1, due to lithium-titanate battery's unique anode material, lithium-titanate may have an even higher thermal stability compared to lithium-ion phosphate battery and other lithium-ion chemistries as described above since lithium-titanate operates at a lower operating voltage and includes an added layer of safety during rapid charging or discharging. Additionally, or alternatively, lithium-titanate battery may be less prone to the formation of lithium dendrites (i.e., tiny needle-like structures that can grow inside the battery and cause short circuits) compared to lithium-ion phosphate battery.

Still referring to FIG. 1, lithium-titanate battery may include a much lower internal resistance that varies based on specific design and size of the cell compared to lithium-ion phosphate battery, wherein the internal resistance of lithium-titanate battery may range from 1 mΩ to 5 mΩ.

With continued reference to FIG. 1, lithium-titanate battery may be paired with a source charger having a nominal voltage of around 2.4V per cell (charging voltage may range from 2.7V to 2.85V per cell). In some cases, since lithium-titanate battery supports very high charge rates (up to 5C or even higher) e.g., a lithium-titanate battery with a capacity of 10 Ah may be charged at 50 A, a CC followed by a CV charging may be employed by corresponding source charger to rapidly charge the lithium-titanate battery.

Still referring to FIG. 1, charger power source for second power storage component may include any charger power source as described above, such as, without limitation, alternating current (AC) power source, DC power source, solar panels, regenerative systems as described in detail below, grid energy storage, generators and/or the like. In some cases, charger power source may include an inverter configured to transform AC electrical power into DC electrical power as described in detail below. In other cases, inverter may be configured to transform DC electrical power into AC electrical power. As used in this disclosure, "alternating current" is a flow of electric charge that periodically reverses direction. In some cases, an alternating current may continuously change magnitude over time; this contrasts with what may be called a pulsed direct current. As used herein, "direct current" is a flow of electric charge in only one direction.

With continued reference to FIG. 1, supercapacitor (SC) within third power storage component may include a different energy storage mechanism. In a non-limiting example, supercapacitor may implement a physical separation of electrical charges, specifically through electrostatic double-layer capacitance and, in some cases, pseudocapacitance. Supercapacitor may include two electrodes separated by an ion-permeable membrane (separator), and an electrolyte ionically connecting both electrodes. When electrodes are polarized by an applied voltage, from source charger, ions in electrolyte may form electric double-layers of opposite polarity to electrodes' polarity. For example, and without limitation, positively polarized electrodes may have a layer of negative ions at the electrode/electrolyte interface along with a charge-balancing layer of positive ions adsorbing onto the negative layer (the opposite is true for the negatively polarized electrode). Additionally, depending on electrode material and surface shape, some ions may permeate double layer becoming specifically absorbed ions and contribute with pseudocapacitance to the total capacitance of supercapacitor as described herein. Source profile associated with supercapacitor is described in detail below.

Still referring to FIG. 1, supercapacitor may include an energy density that is significantly lower than other batteries as described above such as lithium-ion phosphate battery and lithium-titanate battery, ranges from 5 to 10 Wh/kg. This means that supercapacitor may store less energy for its weight. However, power density of supercapacitor may be extremely high, e.g., ranging from 1,000 to 10,000 W/kg, allowing supercapacitor to deliver rapid bursts of energy, wherein the "bursts of energy", for the purpose of this disclosure, refer to a rapid and sudden delivery of a significant amount of power over a short duration. In some cases, this may contrast with a steady or prolonged delivery of power at a consistent rate. In a non-limiting example, due to supercapacitor's high-power density and low internal resistance (i.e., similar to lithium-titanate battery, 1 mΩ to 5 mΩ, up to 10 mΩ), supercapacitors may release stored energy very quickly.

Still referring to FIG. 1, supercapacitor may operate between 2.5V to 2.7V per cell. In some cases, modules with multiple cells may achieve higher operational voltages. Supercapacitor may have an exceptionally long cycle life e.g., exceeding 1 million charge/discharge cycles with minimal degradation. Supercapacitor may be charged and discharged in seconds to minutes (much faster compared to conventional batteries as described above). In some cases, Supercapacitor may include a wide operational temperature range from −40° C. to 65° C. or even 85° C. in some cases.

Still referring to FIG. 1, supercapacitor may include a higher self-discharge rate (i.e., supercapacitor may lose its charge in a few days to weeks), for example, and without limitation, voltage of supercapacitor may drop from 0.9V to 0.48V within 10 hours (depends on the specific design and environmental conditions). Additionally, or alternatively, supercapacitor may include a low leakage current (i.e., the current that flows when the supercapacitor is in a charged state and not delivering power) e.g., ranges from a few microamperes (μA) to several milliamperes (mA) depending on the size and design. In some cases, supercapacitor may come in various shapes and sizes, including cylindrical, prismatic, pouch forms, and/or the like.

With continued reference to FIG. 1, CC charging may be employed by source charger of third power storage component having supercapacitor. In some cases, charging voltage of supercapacitor may be determined by rated maximum voltage of supercapacitor e.g., 2.5V to 2.7V per cells. In some cases, charging rate of source charger may only be limited by supercapacitor's equivalent series resistance (ESR) and thermal considerations. As the voltage approaches the supercapacitor's rated maximum, the charging process may either be halted or transitioned to a trickle charge mode to sustain the achieved voltage level. In a non-limiting example, a charger power source such as, without limitation, a solar panel, a regenerative braking system as described in detail below, or any other charger power source as described herein, may be used to charge supercapacitor via connected source charger. A trickle charging may be initiated by source charger at 2.65V for an exemplary supercapacitor with a 2.7V maximum rating.

With continued reference to FIG. 1, further, source charger 108 for power source 104 as described herein (including lithium-ion phosphate battery, lithium-titanate battery, and/or supercapacitor) may include one or more safety features. In a non-limiting example, source charger may include an overvoltage protection, an overcharge protection (i.e., stop charging if lithium-ion phosphate battery's battery voltage exceeds pre-determined safe limits), a short circuit protection (i.e., prevents damage by cutting off charging process if a short circuit is detected), a reverse polarity protection (i.e., protects lithium-ion phosphate battery and source charger from damage if the battery is connected in reverse), among others.

With continued reference to FIG. 1, system 100 may include one or more inverters. In an embodiment, one or more inverters may be integrated into at least two power storage components 102a-n, configured to convert DC from source charger 108 and/or charger power source 110 as described above into AC. An "inverter," as used in this this disclosure, is a power electronic device or circuitry that changes direct current (DC) to alternating current (AC). In some cases, inverter (also called a power inverter) may be entirely electronic or may include at least a mechanism (such as a rotary apparatus) and electronic circuitry. In some embodiments, static inverters may not use moving parts in conversion process. Inverters may not produce any power itself; rather, inverters may convert power produced by a DC power source. Inverters may often be used in electrical power applications where high currents and voltages are present; circuits that perform a similar function, as inverters, for electronic signals, having relatively low currents and potentials, may be referred to as oscillators.

Still referring to FIG. 1, in some cases, circuits that perform opposite function to an inverter, converting AC to DC, may be referred to as rectifiers. One or more inverters as described herein may be configured to accept DC and produce AC. In a non-limiting example, one or more inverters may produce different types of AC waveforms such as, without limitation, Sine wave, modified Sin wave, square wave, and/or the like. AC may be used to power external load as described above, such as, without limitation, a vehicle's electric motor.

With continued reference to FIG. 1, in an embodiment, each power storage component of at least two power storage components 102a-n may further include one or more "transformers," electrical devices that transfer electrical energy between two or more circuits or components e.g., power sources 104 and one or more inverters as described above through electromagnetic induction. In some cases, transformer may include a core, typically made of iron or ferrite, provides a controlled path for magnetic flux generated in the transformer, a primary winding where the input or source voltage is applied, and a secondary winding wherein the output or load voltage is taken. In a non-limiting example, transformers may increase (step-up) or decrease (step-down voltage level from its primary side to its secondary side, determined by a ratio of turns between primary and secondary windings. Transformers may be used to step up the voltage i.e., reducing the current and, therefore, line losses for transmission of electrical power between power source 104 and rest of system 100 (and then potentially step it down for local distribution and use). In some cases, pulsed DC signals may require special transformers such as, without limitation, pulse transformers. Other exemplary embodiments of transformers such as, without limitation, isolation transformers, auto-transformers, and/or the like may be employed by system 100, as an ordinary person skilled in the art, upon reviewing the entirety of this disclosure, to meet specific voltage regulation, impedance matching, or power conversion requirements, as directed by unique characteristics and demands of electrical systems and applications being addressed as described herein.

With continued reference to FIG. 1, power storage components 102a-n may be selected in a plurality of combinations of power sources with or without distinct source types to carter to diverse operational requirements and environmental conditions. In an embodiment, power storage components 102a-n may include a "High Energy+High Power+Fast Response" combination, wherein such power source combination may include an integration of a lithium-ion ($LiCoO_2$ or NMC) battery (known for high energy density, suitable for prolong energy supply), a nickel-metal hydride (NiMH) battery (offers a balance between energy and power, often sued in hybrid vehicles), and a graphene supercapacitor (known for extremely fast charge/discharge rates and high power delivery.

Still referring to FIG. 1, in another embodiment, power storage components 102a-n may include a "Stability+Fast Charge+Longevity" combination, wherein such power source combination may include an integration of a lithium-iron Phosphate battery (recognized for its stability and safety as described above), a lithium-titanate battery (known for fast charging capabilities and long cycle life as described above), and a carbon-based supercapacitor (offers rapid charge/discharge rates).

Still referring to FIG. 1, in yet another embodiment, power storage components 102a-n may also include a "Low Temperature+High Power+Fast Response" combination, wherein such power source combination may include an integration of a lithium-nickel cobalt aluminum oxide (LiHi-CoAlO$_2$) battery (offers good performance at lower temperatures), a nickel-cadmium (NiCd) battery (know for high power delivery, especially in colder conditions), and a pseudocapacitor (combines battery-like energy storage with supercapacitor-like fast charge/discharge).

Still referring to FIG. 1, in yet another embodiment, power storage components 102a-n may also include an "Economical+Sustainable+Fast Response" combination, wherein such power source combination may include an integration of a lead-acid battery (an economical technology with moderate energy density), a sodium-ion battery (having abundant sodium as an alternative to lithium, offering sustainability), and a hybrid supercapacitor (combines characteristics of traditional capacitors and batteries, offering moderate energy storage with fast response times.

Still referring to FIG. 1, in a further embodiment, power storage components 102a-n may include a "High Temperature+Longevity+Fast Response" combination, wherein such power source combination may include an integration of a sodium-sulfur (NaS) battery (operates at high temperatures and offers good energy density), a lithium-manganese oxide (LiMn$_2$O$_4$ or LMO) battery (known for stability at higher temperatures and decent lifespan), and an organic supercapacitor (uses organic electrolytes and operates at varying temperatures with fast response times).

With continued reference to FIG. 1, it should be noted that the above listed power source combination is illustrative and not exhaustive; system 100 may be configured with different combinations beyond the mentioned three power sources. In a non-limiting example, more than three power sources, such as, without limitation, nickel-zinc, molten-salt, and/or flow batteries may also be integrated into system 100 as described herein. As an ordinary person skilled in the art, upon reviewing the entirety of this disclosure, will be aware of various power sources as listed above, as well as other power sources that may not be explicitly described in the current disclosure that may be incorporated into system 100. Additionally, terms such as "high," "low," "moderate," "fast," "good," "descent," and the like are relative and should be interpreted in the context of the specific application and the known standards in the industry. Their usage in this document is for illustrative purposes and should not be construed to limit the scope of the current disclosure in any manner.

With continued reference to FIG. 1, in some cases, each power storage component of at least two power storage components 102a-n may include a battery management and Balancing module (BMBM) 112 electrically connected to each power source 104. As used in this disclosure, a "Battery Management and Balancing Module" is a system of a sub-system designed to oversee and optimize the operation of individual units (e.g., cells) within connected power source 104 (e.g., a battery pack). In an embodiment, BMBM 112 may include an electronic system that manages a rechargeable battery such as any battery as described above. In some cases, BMBM 112 may include a processing circuit and/or any computing device as described herein configured to execute predefined tasks or operations related to battery management and balancing, as described in detail below. In some cases, processing circuit may be communicatively connected to a memory. As used in this disclosure, "communicatively connected" means connected by way of a connection, attachment, or linkage between two or more relata which allows for reception and/or transmittance of information therebetween.

Still referring to FIG. 1, for example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, in some cases, processing circuit may include, without limitation, a microcontroller (MCU), a microprocessor (MPU), a digital signal processor (DSP) and/or system on a chip (SoC) as described in this disclosure. Processing circuit may include, be included in, and/or communicate with a mobile device such as a mobile telephone or smartphone. Processing circuit may include a single computing device operating independently, or may include two or more computing device operating in concert, in parallel, sequentially or the like; two or more computing devices may be included together in a single computing device or in two or more computing devices. Processing circuit may interface or communicate with one or more additional devices as described below in further detail via a network interface device. Network interface device may be utilized for connecting processing circuit to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof.

Still referring to FIG. 1, in some cases, network may employ a wired and/or a wireless mode of communication. In general, any network topology may be used. Information (e.g., data, software etc.) may be communicated to and/or from a computer and/or a computing device. Processing circuit may include but is not limited to, for example, a computing device or cluster of computing devices in a first location and a second computing device or cluster of computing devices in a second location. Processing circuit may include one or more computing devices dedicated to data storage, security, distribution of traffic for load balancing, and the like. Processing circuit may distribute one or more computing tasks as described below across a plurality of computing devices of computing device, which may operate in parallel, in series, redundantly, or in any other manner used for distribution of tasks or memory between computing devices. Processing circuit may be implemented, as a non-limiting example, using a "shared nothing" architecture.

With continued reference to FIG. 1, processing circuit may be designed and/or configured to perform any processing steps as described below in this disclosure, or sequence of method steps in any embodiment described in this disclosure, in any order and with any degree of repetition. For instance, processing circuit may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processing circuit may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, BMBM 112 may also include a sensor communicatively connected to processing circuit as described above within each power storage component. BMBM 112 may integrate a plurality of sensors configured to detect a power source datum 114. As used in this disclosure, "power source datum" refers to a specific piece of information or a set of data points related to at least a power source within at least two power storage components 102a-n. In some cases, power source datum 114 may include various metrics or values describing current condition, capacity, efficiency, or any other relevant parameters of power source 104. In an embodiment, one or more power source datums may be produced based on BMBM's 112 state monitoring. Such power source datums may be related to state of charge (SoC) i.e., the current battery capacity as a percentage of its maximum capacity, state of health (SoH) i.e., the overall condition of the battery indicated by battery's current capacity relative to its original capacity, and/or state of function (SoF) i.e., the ability of battery to deliver the required function considering both SoC and SoH as described herein. In a non-limiting example, power source datum 114 may include voltage level, current flow, temperature, internal resistance, cycle count, usage time, operational status, energy capacity, and/or the like, determined based one or more readings/signals from various sensors as described in detail below.

With continued reference to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by sensor, processing circuit, and/or any other computing device as described herein, for example by way of an input/output port.

With continued reference to FIG. 1, in some cases, plurality of sensors may be in the form of individual sensors or a sensor suite working in tandem or individually. A sensor suite may include a plurality of independent sensors, as described herein, where any number of the described sensors may be used to detect any number of physical or electrical quantities associated with corresponding power source or power storage component. Independent sensors may include separate sensors measuring physical or electrical quantities that may be powered by and/or in communication with circuit independently, where each may signal sensor output to processing circuit. In a non-limiting example, there may be four independent sensors housed in and/or on each BMBM 112 configured to measuring temperature, electrical characteristic such as voltage, amperage, resistance, or impedance, proximity, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of BMBM 112 to detect phenomenon is maintained.

With continued reference to FIG. 1, in some cases, sensor may include electrical sensors. Electrical sensors may be configured to measure voltage across a component, electrical current through a component, and resistance of a component. Electrical sensors may include separate sensors to measure each of the previously disclosed electrical characteristics such as voltmeter, ammeter, and ohmmeter, respectively. Alternatively, or additionally, sensor may include a sensor or plurality thereof configured to detect voltage and direct the charging of individual the battery cells according to charge level; detection may be performed using any suitable component, set of components, and/or mechanism for direct or indirect measurement and/or detection of voltage levels, including without limitation comparators, analog to digital converters, any form of voltmeter, or the like. For instance, and without limitation, sensor may be configured to determine that a charge level of a battery cell is high based on a detected voltage level of connected power source 104.

Still referring to FIG. 1, sensor may alternatively or additionally detect a "charge reduction event", defined for purposes of this disclosure, as any temporary or permanent state of a battery cell requiring reduction or cessation of charging; a charge reduction event may include at least a portion of power source e.g., a battery cell being fully charged and/or a cell undergoing a physical and/or electrical process that makes continued charging at a current voltage and/or current level inadvisable due to a risk that power source or at least a portion of power source will be damaged, will overheat, or the like. Detection of a charge reduction event may include detection of a temperature, of the cell above a threshold level, detection of a voltage and/or resistance level above or below a threshold, or the like.

With continued reference to FIG. 1, sensor may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor, may be measured in Fahrenheit (° F.), Celsius (° C.), Kelvin (° K), or another scale alone or in combination.

Still referring to FIG. 1, in a non-limiting example, sensor may include digital sensors, analog sensors, or a combination thereof. Sensor may include digital-to-analog converters (DAC), analog-to-digital converters (ADC, A/D, A-to-D), other signal conditioning components, or a combination thereof, used in transmission of one or more detected data points as described herein (e.g., temperature, voltage level, charge level, current level, and/or the like) to a destination such as processing circuit over wireless or wired connection by converting the detected data points into digital data that the processing circuit can process.

With continued reference to FIG. 1, processing circuit within BMBM 112 may be configured to collect and/or report data points signaled by one or more sensors for further processing. In a non-limiting example, an analog signal may be digitized, for example by ADC. Analog signal may be processed by any analog signal processing steps as described in this disclosure, prior to digitization. Digital signal (i.e., digital data) may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 1, in some cases, processing circuit and/or any other computing devices as described herein may perform one or more signal processing steps on a signal. For instance, processing circuit of BMBM 112 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers.

Still referring to FIG. 1, in some cases, digital signal processing may be used, by processing circuit and/or any other computing devices as described herein to process digitized discrete-time sampled signals. Commonly, digital signal processing may be performed by processing circuit, a computing device, or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued, and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, sensor may also include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of external load as described in detail below. Byproducts of cell failure may include gaseous discharge including oxygen, hydrogen, carbon dioxide, methane, carbon monoxide, a combination thereof, or another undisclosed gas, alone or in combination.

Still referring to FIG. 1, in a non-limiting example, BMBM 112 may include a gas detector configured to detect vent gas from electrochemical cells. For the purposes of this disclosure, a "gas detector" is a device used to detect a gas is present in an area. Gas detectors, and more specifically, the gas sensor that may be used in sensor, may be configured to detect combustible, flammable, toxic, oxygen depleted, a combination thereof, or another type of gas alone or in combination. The gas sensor that may be present in sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. Sensor may include sensors that are configured to detect non-gaseous byproducts of cell failure including, in non-limiting examples, electrical anomalies as detected by any of the previously disclosed sensors or components.

With continued reference to FIG. 1, in some cases, sensor may be configured to detect events where voltage nears an upper voltage threshold or lower voltage threshold. The upper voltage threshold may be stored in a data acquisition (and storage) system as described in detail below for comparison with an instant measurement taken by any combination of sensors present within sensor. In an embodiment, upper voltage threshold may be calculated and calibrated based on factors relating to battery cell health, maintenance history, location within battery pack, designed application, and type, among others. Sensor may measure voltage at an instant, over a period of time, or periodically. Sensor may be configured to operate at any of these detection modes, switch between modes, or simultaneous measure in more than one mode. In other cases, BMBM 112 may detect through sensor events where voltage nears the lower voltage threshold. The lower voltage threshold may indicate power loss to or from an individual battery cell or portion of the battery pack. In an embodiment, BMBM 112 may detect through sensor events where voltage exceeds the upper and lower voltage threshold. Events where voltage exceeds the upper and lower voltage threshold may indicate battery cell failure or electrical anomalies that could lead to potentially dangerous situations for system 100, connected external load, and personnel that may be present in or near its operation.

With continued reference to FIG. 1, in some cases, processing circuit of BMBM 112 may be configured to adjust charge to power source 104 as a function of detected parameter as described above; this may include adjustment in charge as a function of detection of a charge reduction event. Alternatively, or additionally, plurality of sensors incorporated therein and/or communicatively connected thereto may be configured to increase charge, using source charger 108, to power source 104 upon detection that a charge reduction event has ceased; for instance, plurality of sensors incorporated therein and/or communicatively connected thereto may detect that a temperature of a subject battery cell within power source 104 has dropped below a threshold, and may increase charge again. In some embodiments, charge may be regulate using any suitable means for regulation of voltage and/or current, including without limitation use of a voltage and/or current regulating component, including one that may be electrically controlled such as a transistor; transistors may include without limitation bipolar junction transistors (BJTs), field effect transistors (FETs), metal oxide field semiconductor field effect transistors (MOSFETs), and/or any other suitable transistor or similar semiconductor element. Voltage and/or current to one or more power sources 104 may alternatively or additionally be controlled by thermistor in parallel with a cell that reduces its resistance when a temperature of the cell increases, causing voltage across the cell to drop, and/or by a current shunt or other device that dissipates electrical power, for instance through a resistor.

Continuing with reference to FIG. 1, additionally, or alternatively, BMBM 112 may implement one or more aspects of cell balancing to ensure that all individual cells within power source 104 across at least two power storage components 102a-n maintain an equal/uniform state of charge. In an embodiment, cell balancing may address disparities in the charge levels of individual cells within power source 104. In a non-limiting example, BMBM 112 may employ an active cell balancing, wherein the "active cell balancing" transfers energy from higher charged cells, detected via through array of sensors and configured by processing circuit, to lower charged ones. In another non-limiting example, BMBM 112 may employ a passive cell balancing, wherein the "passive cell balancing" dissipates excess energy from higher charged cells usings one or more resistors as described above. As an ordinary person skilled in the art, upon reviewing the entirety of this disclosure, will appreciate the importance of maintaining uniformity in cell charge levels to optimize battery performance, extend battery life, and ensure safety. The described methods of cell balancing, both active and passive, serves as mechanisms within system 100 to ensure power storage components 102a-n operates within its optimal parameters to deliver the most desirable performance in terms of power output and efficiency.

With continued reference to FIG. 1, system 100 includes at least one power path controller 116 operatively connected to at least two power storage components 102a-n. As used in this disclosure, a "power path controller" is an electronic component or system designed to manage and control a plurality of power paths, wherein each "power path," for the purpose of this disclosure, refers to a flow of electrical power between one or more power sources and external load as described in detail below. In some cases, at least one power path controller 116 may be configured to ensure that electrical power is efficiently and safely delivered from at least two power storage components 102a-n to external load based on specific criteria or conditions e.g., a selection of one or more source profiles associated with power sources within system 100 as described in detail below.

With continued reference to FIG. 1, in some cases, at least one power path controller 116 may include a plurality of sub-controllers 118a-n, wherein each power path sub-controllers may be operative connected to a power storage component of at least two power storage components 102a-n. In a non-limiting example, power source 104 within each power storage component may be interfaced and managed by a corresponding power path sub-controller within power path controller 116. As used in this disclosure, "operatively connected" refers to a functional linkage between two components e.g., power storage components 102a-n and at least one power path controller 116, allowing for transfer of data, control signals, power, and/or the like. Such connection may ensure that system components can communicate and cooperate in a coordinated manner to achieve desired system functionalities as described herein. In some cases, similar to communicative connection, operative connection may also be established through wired or wireless means, and may include one or more intermediary devices or systems to facilitate this connection, for example, and without limitation, one or more sensing modules 120a-n may be connected in between power storage components 102a-n and corresponding power path sub-controllers 118a-n.

Still referring to FIG. 1, sensing modules 120a-n may include any sensor as described above in this disclosure, such as, without limitation, voltage sensor, current sensor, temperature sensor, and/or the like configured to detect one or more power source datums 114. In a non-limiting example, each sensing module may be configured to detect and output, a voltage level of $i^{th}$ power source/battery within at least two power storage components 102a-n (batteryi_voltage), a set of parameters related to positive current sensed in a particular channel of system 100 (CH_Isns_POS), a set of parameters related to negative current sensed in the channel of system 100 (CH_Isns_NEG), grounding connection associate with the channel (CH1_GND), among others.

With continued reference to FIG. 1, in a non-limiting example, power path controller 116 may include a first power path sub-controller connected to first power storage component (lithium-ion phosphate), a second power path sub-controller connected to second power storage component (lithium-titanate), and a third power path sub-controller connected to third power storage component (supercapacitor). First, second, and third sub-controller may be connected in parallel, allowing the three power path sub-controller to operate concurrently yet independently. Power path controller 116 may continuously monitor these three sub-controller and may be configured to switch between or combining power outputs from corresponding power storage components based on power source datums 114 as listed above.

With continued reference to FIG. 1, in some cases, each power storage component of at least two power storage components 102a-n may be connected to at least one power path controller 116 and/or corresponding power path sub-controller via a positive terminal, while the negative terminal of each power storage component, in some cases, may be connected to a ground 122. Positive terminal (+) of power storage component may represent a higher voltage or positive voltage of power source 104. Electrons flow from the negative terminal to the positive terminal, which is opposite to the direction of conventional current flow. In some cases, positive terminal may be a point from which current enters system circuit. Negative terminal (−) on the other hand, may represent a lower voltage or negative voltage of power source 104. Electrons flow into the negative terminal from the system circuit, completing the electrical circuit. In some cases, negative terminal may be a point where current exits the system.

Still referring to FIG. 1, a "ground," (also known as "earth") for the purpose of this disclosure, refers to a reference point that represents zero voltage. In some cases, ground 122 may provide a common return path for electric current and serves as a baseline against which other voltages in system 100 may be measured. In an embodiment, grounding negative terminal of each power storage component may direct any unintended current (due to faults or short circuits) from device, system, or external load, preventing potential electric shocks or fires. In another embodiment, by grounding negative terminal of each power storage component, system 100 may have a common voltage reference configured to ensure that voltage levels are consistent and predictable across all power storage components 102*a-n* within system 100. In yet another embodiment, grounding negative terminal of each power storage component may help in reducing electrical noise in system 100. In some cases, electrical noise may be introduced from various sources, such as other electronic devices, radio frequencies, or even the switching actions within system 100. In a non-limiting example, ground 122 may include a chassis ground.

With continued reference to FIG. 1, in some cases, power path controller 116 and/or each power path sub-controllers may include any processing circuit and/or computing device as described in this disclosure, configured to receive data/signal transmitted by BMBM 112, sensing modules 120*a-n*, and/or the like within system 100. In an embodiment, power path controller 116 may further include an output power management module (OPMM) 124 (or simply an output power controller), wherein the OPMM, for the purpose of this disclosure, is an electronic component or system configured to manage, regulate, and monitor the power output from one or more power sources to external load as described in detail below. In some cases, OPMM 124 may also include sensing module as described above. In a non-limiting example, sensing module of OPMM 124 may be connected to a data acquisition and storage module 126.

Still referring to FIG. 1, as used in this disclosure, a "data acquisition and storage module (DASM)" is a system designed to capture, process, and/or store real-time data e.g., power source datums 144 from various sensors, instruments, or any other data sources. In some cases, DASM 126 may include an integrated electronic system, however, in other cases, DASM 126 may include an external system, configured to collect, and store power source datums 144 such as, without limitation, temperature, voltage level, signal waveforms, digital data streams, and/or the like. In some cases, power source datums 144 may be conditioned, for example, and without limitation, amplified weak signals, filtering out noise, and/or the like before processing or storing. Data normalization, calibration, or even preliminary analysis may be performed by DASM 126 prior to storing to a storage facility such as, without limitation, an onboard memory, flash storage, or even external storage devices or data centers.

Continuing to reference FIG. 1, DASM 126 may be configured to aggregate power source datums 144 from plurality of power path sub-controllers 118*a-n*. In a non-limiting example, DASM 126 may include one or more communication ports or wireless interface to receive a plurality of power source datums from each of plurality of power path sub-controllers 118*a-n*, wherein the plurality of power source datums may include, but is not limited to, "batteryi_voltage," "CH_Isns_POS," "CH_Isns_NEG," and "CH_GND" as described above. DASM 126 may be configured to aggregate plurality of power source datums received from each power path sub-controller. For instance, and without limitation, "CH_Isns_POS" and/or "CH_Isns_NEG" of each channel i.e., power storage component, may be grouped into a single parameter or a set of parameters that related to (an averaged) positive current sensed all channels of system 100, referred to as "SysOut_Isns_POS" and/or "SysOut_Isns_NEG." Such aggregated data may be used in further processing steps as described in detail below.

With continued reference to FIG. 1, additionally, or alternatively, DASM 126 may include a database 128. Database 128 may be implemented, without limitation, as a relational database, a key-value retrieval database such as a NOSQL database, or any other format or structure for use as a database that a person skilled in the art would recognize as suitable upon review of the entirety of this disclosure. Database 128 may alternatively or additionally be implemented using a distributed data storage protocol and/or data structure, such as a distributed hash table or the like. Database 128 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, sensing module of OPMM 124 may be connected to a shunt 130. As used in this disclosure, a "shunt" is a low-resistance device used to create a known current-to-voltage relationship in an electrical circuit. In some cases, shunt 130 may be placed in parallel with an instrument or component e.g., at least one power path controller 116 as described herein, allowing most of the current to flow through the shunt while a known fraction passes through the other device e.g., sensing module of OPMM 124, thereby enabling a measurement of high currents by observing the voltage drop across shunt 130, which may then be scaled to infer the current through the main power path 132 (i.e., a power path or a section of power path that is directly connected to external load). In a non-limiting example, shunt 130 placed in between at least one power path controller 116 and external load may measure the voltage drop across it, the current flowing through the circuit may be then determined using Ohm's law. Exemplary embodiments of shunt 130 may include, without limitation, resistive shunt, magnetic shunt, electronic shunt, Hall Effect shunt, and/or the like. As an ordinary person skilled in the art, upon reviewing the entirety of this disclosure, will be aware of various shunts system 100 may implement for data monitoring and component protection purposes as described herein.

With continued reference to FIG. 1, at least one power path controller 116 is configured to receive an input signal 132. As used in this disclosure, an "input signal" refers to data or stimulus that fed into system 100, device or modules thereof to influence its operation or to be processed. In a non-limiting example, input signal 132 may include voltage level or a range of voltage levels that at least one power path controller uses to determine the state or condition of one or more power storage components and/or external load. In another non-limiting example, input signal 132 may include current levels i.e., magnitude of current drawn by external load such as a motor which may be used by at least one power path controller 116 to determine a load or stress level of system 100. Additionally, or alternatively, input signal 132 may include digital signal or analog signal as described above. For example, and without limitation, in some cases, input signal 132 may be detected by sensing module and may be further transmitted to each connected power path sub-controller. Further, in some cases, input signal 132 may include a pulse width modulated (PWM) signal, wherein the PWM signal may be used to represent analog signal values using digital means. The width of the pulse may indicate the magnitude of the value.

With continued reference to FIG. 1, in some cases, system 100 may be designed to operate based on a uniform input signal 132 received by at least one power path controller 116. A singular input signal 132 that guides system operations across all connected power storage components 102a-n may be received from various means as described below. In a non-limiting example, such configuration may be beneficial in scenarios where a synchronized response from all power storage components 102a-n is desired. If system 100 need to rapidly respond to a sudden surge in power demand, a uniform input signal may ensure that all power storage components may activate simultaneously, thereby providing a combined and immediate boost in power output.

With continued reference to FIG. 1, in other cases, each power path sub-controller within at least one power path controller 116 may receive a distinct input signal 132 from various means as described below. In a non-limiting example, when a granular control of system 100 is desired, such configuration may be implemented by system 100. By receiving different input signals, each power path sub-controller may operate its corresponding power storage component based on corresponding source profile 106 and/or changes within the corresponding source profile 106 as described above such as, without limitation, state of charge or other specific conditions. For example, and without limitation, if one power storage component such as third power storage component i.e., supercapacitor is better suited for quick bursts of energy, the respective power path sub-controller may receive an input signal prompting the supercapacitor to activate during short, high-demand scenarios. Meanwhile, another power storage component, such as first power storage component i.e., lithium-ion phosphate battery may receive another input signal directing it to provide a steady, longer-duration power output.

Still referring to FIG. 1, in some embodiments, input signal 132 may be received from external load, for example, and without limitation, a vehicle engine. Input signal 132 may include frequency signals i.e., one or more sensors or devices may output signals whose frequency changes based on measured parameters. For instance, and without limitation, a tachometer may output a frequency signal proportional to an engine's RPM. In some embodiments, input signal 132 may include a plurality of communication protocols. In a non-limiting example, input signal 132 may include a series of data packets following a specific communication protocol such as, I2C, SPI, CAN, and/or the like. In other embodiments, input signal 132 may include internal feedback signals i.e., signals that come from system 100 itself, representing its current state or performance; for instance, and without limitation, one or more power source datums 114 as described above.

With continued reference to FIG. 1, in some cases, input signal 132 may include a signal signaling a kill circuit 134. As used in this disclosure, a "kill circuit" is a safety mechanism designed to immediately halt or disconnect power flow from corresponding power storage component, ensuring the protection of both system 100 and any connected external loads (from overcurrent, overheating, or any other potentially hazardous condition). In some cases, each power path sub-controller may be connected to kill circuit 134. In an embodiment, kill circuit 134 may include a plurality of MOSFETs, each is connected to a corresponding power path sub-controller within at least one power path controller 116. MOSFETs may be low on-resistance and high off-resistance configured to minimize power loss during regular operation and completely disconnect when kill circuit 134 is activated. In some cases, plurality of MOSFETs may be used in parallel to handle high currents or to provide redundancy, ensuring that kill circuit remains operational even if one or the MOSFETs fails.

Still referring to FIG. 1, in some embodiments, if received input signal 132 such as, without limitation, voltage level, current level, temperature level, and/or the like exceeds one or more pre-defined safe threshold, kill circuit 134 may be activated, immediately disconnect or isolate affected power storage components. In a non-limiting example, BMBM 112 may detect an abnormally high temperature of one or more power sources within at least two power storage components 102a-n and may generate a "CH_Kill_N" input signal to one or more power path sub-controller, prompting at least one power path controller 116 to instantly disconnect the overheating component from system 100 by switching current power path to an alternative power path that is not utilizing those power sources.

With continued reference to FIG. 1, additionally, or alternatively, input signal 132 may be received from external computing devices. In a non-limiting example, input signal 132 may include a user input e.g., a command to switch between power storage components, adjusting the power output, and/or monitor the current state of system 100, from a user interface (e.g., GUI) of a display device (e.g., a touchscreen panel, a digital dashboard, or a remote control application on a user device such as smartphone or tablet) communicative connected to OPMM 124, at least one power path controller 116, and/or the like. In some cases, a user such as, a technician, a vehicle operator, or a system administrator may choose to override the automated decisions of power path controller, input custom or user-derived power source datums, selecting a specific power storage component manually, setting a preferred power output level, or even initiating diagnostic tests to ensure system's 100 is operate at a desired performance.

Still referring to FIG. 1, input signal 132 may be further received from one or more external systems. In a non-limiting example, at least one power path controller 116 may receive input signal 132 from a vehicle's ECU (Engine Control Unit), wherein the vehicle's ECU may be configured to provides data about a vehicle's current operating conditions, speed, acceleration, among others. In another non-limiting example, at least one power path controller 116 may also receive input signal 132 from a navigation system, wherein the navigation system offers data about upcoming terrain, like uphill or downhill stretches, which may influence power source selection as describe in detail below. In other embodiments, if system 100 is part of a larger network or connected to the internet, input signals 132 may be received remotely. For instance, and without limitation, at least one power path controller 116 may receive input signal 132 from a plurality of IoT devices, wherein such input signal may include data about energy consumption patterns, grid health, and/or the like. In other cases, remote servers such as a centralized server may send commands or data to power path controller remotely over the internet. Other exemplary embodiments of external system may include, without limitation, diagnostic tools, safety system, among others.

With continued reference to FIG. 1, at least one power path controller 116 is then configured to selectively switch between source profiles correspond to the power sources of the at least two power storage components 102*a-n* based on received input signal 132, thereby configuring at least one power storage component of at least two power storage components 102*a-n* to provide stored power to an external load 136. "Selectively switch between source profiles," as described herein, refers to the capability of the at least one power path controller 116 to choose, in real-time, which power storage component among at least two power storage components 102*a-n* or combinations thereof should be activated or prioritized to cater to the current power demand by external load 136. Each power storage component of at least two power storage components 102*a-n* may have an associated "source profile" which encapsulates data related to its inherent properties, behavioral traits, and performance characteristics, as discussed earlier.

Still referring to FIG. 1, as used in this disclosure, an "external load" refers to any device, system, or otherwise component that draws power or energy from a primary source or system. In an embodiment, external load 136 may include any electrical appliance, machinery, or component that consumes electrical energy supplied by any power source as described herein, such as, without limitation, a battery, generator, or electrical grid. In a non-limiting example, external load 136 may include simple devices such as one or more light bulbs and/or fans. In another non-limiting example, external load 136 may include complex systems such as industrial machinery, computers, or electric vehicles. External load 136 may determine the amount of current drawn from connected power source, and its electrical characteristics, such as, without limitation, resistance, inductance, and capacitance may include the behavior and performance of the power source as described herein. An exemplary embodiment of external load 136 is described in detail below with reference to FIG. 3.

With continued reference to FIG. 1, In an embodiment, system 100 may include the ability of at least one power path controller 116 to dynamically adjust its operations based on received input signal 132 as described above. In an embodiment, at least one power path controller 116 and/or each power path sub-controller thereof may be configured to execute one or more decision-making processes informed by the input signal 132. Input signal 132 may originate from various sources as described above, such as one or more sensors and/or sensing modules monitoring system's state, external load, or user inputs. In a non-limiting example, at least one power path controller 116 and/or each power path sub-controller thereof may determine one or more most suitable power storage components to activate, based on the data or instructions contained within input signal 132. For instance, and without limitation, if input signal 132 indicates a need for a quick burst of energy, power path controller 116 may prioritize third power storage component such as a supercapacitor and/or any other power storage components having similar source profiles that includes profile elements indicating "rapid discharge" behavior trait. Conversely, for sustained power requirements, a lithium-ion phosphate battery and/or any other power storage components having similar source profiles may be deemed more appropriate.

With continued reference to FIG. 1, various circuit components within at least one power path controller 116 and/or each power path sub-controller may facilitate the selective switching as described herein. For example, and without limitation, one or more MOSFETs, relays, or other types of electronic switches may be employed to establish or break connections with the desired power storage components and/or external load 136. Additionally, or alternatively, processing circuits within power path controller 116 may be configured to analyze the input signal 132, compare it against respective source profiles of (available) power storage components, and execute the switching commands.

Still referring to FIG. 1, in a non-limiting example, in an application of an electric vehicle powered by system 100, wherein the electric vehicle may be about to ascend a steep hill. Sensors within the vehicle may detect the upcoming incline and relay this information as an input signal 132 to the power path controller 116. Recognizing the imminent high-power demand, power path controller 116 may activate both second power storage component i.e., lithium-titanate battery, for its efficient energy delivery, and third power storage component i.e., supercapacitor, for that extra burst of power, ensuring electric vehicle climbs the hill without any performance drop.

With continued reference to FIG. 1, at least one power path controller 116 and/or each power path sub-controller thereof may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below with reference to FIG. 4.

With continued reference to FIG. 1, in some cases, at least one power path controller 116 may include a machine learning module to implement one or more algorithms or generate one or more machine learning models to select one or more source profiles 106 as described above. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs May come from local storage disk, database of DASM 126 as described herein or any other databases, or even be provided by user 116.

Still referring to FIG. 1, in a non-limiting example, machine-learning module may obtain a training set by querying database of DASM 126 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

With continued reference to FIG. 1, in an embodiment, at least one power path controller 116 may be configured to generate and train a source profile selection model using source profile training data, wherein the source profile training data may include a plurality of input signals as input correlated to a plurality of source profile sets as output. In some cases, each source profile set of plurality of source profile sets may include one or more source profiles associated with one or more power sources targeted for demands addressed in each input signal of plurality of input signals. At least one power path controller 116 may then selectively switch, from current source profiles associated to power sources that are currently being used, to a power source or a set of power sources that are corresponding to newly determined and/or selected source profiles by the source profile selection model based on input signal 132 and configuring the power source or the set of power sources to provide stored power to external load 136 as described herein.

Still referring to FIG. 1, in some cases, source profile selection model may also include a classifier, configured to classify received input signal 132 to a plurality of current conditions or desired behavior traits. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processing circuit of at least one path controller 116 may generate a classifier using a classification algorithm, defined as a processes whereby processing circuit derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

In a non-limiting example, and continue referring to FIG. 1, classifier may identify input signals corresponding to high-demand scenarios, such as rapid acceleration in an electric vehicle or high computational tasks in a device, and power path controller 116 may accordingly select a source profile that can deliver higher bursts of energy. Conversely, for input signals indicating a low-demand or standby conditions, classifier may opt for a source profile that emphasizes energy conservation and longevity. Such classifier may be trained using training data containing a plurality of input signals correlated to a plurality of pre-determined conditions, wherein each pre-determined condition of the plurality of pre-determined conditions may be associated with one or more desired behavior traits of one or more power sources that are compatible with system 100 as described herein. Additionally, or alternatively, classifier may be generated prior to source profile selection model as described above, meaning that source profile training data may further include a plurality of predetermined conditions as input correlated to one or more source profile sets as output. Power path controller 116 may subsequently train source profile selection using such source profile training data.

With continued reference to FIG. 1, machine learning module may integrate a feedback loop configured to further refine and optimize the power source selection process as described above. In some cases, feedback loop may continuously monitor the performance of the selected power source in real-time and provides this data back to the power path controller 116. In some cases, such data may be collected and/or stored using DASM 126. In a non-limiting example, feedback loop may be established using a variety of sensors and sensing modules within system 100 that track parameters like voltage, current, temperature, the state of charge, and/or any power source datums 114 of at least two power storage components 102*a-n*. Source profile selection model and/or classifier may evolve over time based on such real-time data. For instance, and without limitation, if feedback loop indicates that a particular power source is depleting faster than anticipated under certain conditions, at least a power path controller 116 may be configured to adjust its selection criteria to either switch to a different power source earlier or combine the outputs of multiple sources to meet the demand. Additionally, or alternatively, by continuously monitoring the health and performance of each power storage component, system 100 may forecast potential issues or failures and proactively switch to alternative sources, ensuring uninterrupted power supply to external load 136.

Still referring to FIG. 1, in a non-limiting example, the processing circuit of at least one power path controller 116 may be further configured to perform a power source maintenance operation determined based on the detected power source datum. As used in this disclosure, a "power source maintenance operation" refers to a set of procedures or actions taken to optimize, restore, or maintain the health and performance of one or more power sources 104 within at least two power storage components 102*a-n*. One or more machine learning models, as described above, may be used to determine one or more power source maintenance operations based on power source datums 114. In some cases, power source maintenance operation may include a cell balancing operation, ensuring that all cells within a battery maintain an equal state of charge. In other cases, the operation may involve thermal management, ensuring that power source 104 operates within a safe temperature range. Other exemplary embodiments of power source maintenance operations may include, without limitation, deep discharge cycles to recalibrate battery capacity, periodic health checks to assess the state of the battery, and predictive maintenance to preemptively address potential issues before they escalate. As an ordinary person skilled in the art, upon reviewing the entirety of this disclosure, will be aware of various power source maintenance operation that can be employed to maintain and optimize the performance and longevity of power sources within system 100.

With continued reference to FIG. 1, in some embodiments, system 100 may further include a regenerative mechanism configured to charge at least one power storage component of at least two power storage components 102*a-n* during an operation of external load 136. As used in this disclosure, a "regenerative mechanism" refers to a system that recovers energy that would otherwise be lost during certain operations, such as braking in electric vehicles, and converts that energy back into a form that can be stored and reused. In a non-limiting example, in case where external load 136 is an electric motor of an electric vehicle, the kinetic energy generated by the electric motor during the electric vehicle decelerates or brakes, instead of being wasted as heat due to friction, may be captured by regenerative mechanism and converted back into electrical energy. This recovered energy is then fed back into one or more batteries or power storage components. In some cases, destination of converted energy may be determined via source profile 106 as described above, and may include, without limitation, utilization of one or more machine learning models as described above.

Still referring to FIG. 1, in another non-limiting example, in industrial machinery or systems with frequent start-stop cycles, regenerative mechanism may capture the energy released during the stopping phase and use it to power the subsequent start-up or other operations, thereby reducing the wear and tear on the machinery, leading to longer operational lifespans and reduced maintenance costs. In some cases, one or more sensors, sensing modules, switches, converters, and/or the like may be used in regenerative mechanism as described herein. In a non-limiting example, one or more sensors and/or sensing modules may detect conditions where energy can be regenerated, one or more switches may control the flow of this energy, and one or more converters may transform the energy into a form suitable for storage. As an ordinary person skilled in the art would appreciate, upon reviewing the entirety of this disclosure, the specific components and configurations of regenerative mechanism can vary based on the application, design considerations, and desired efficiency levels.

Figure 2:
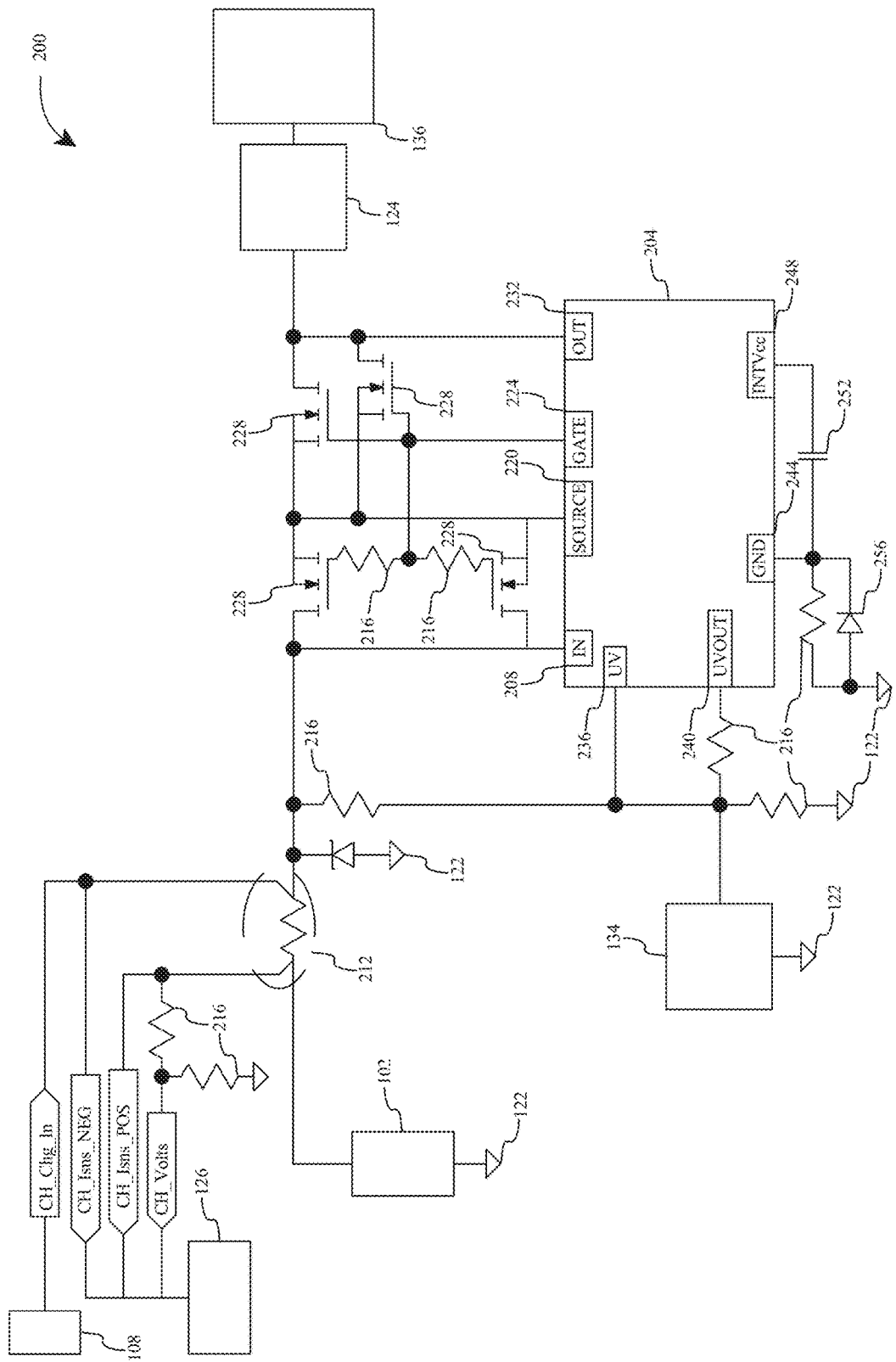
FIG. 2 is an exemplary circuitry of a power path sub-controller.

Now referring to FIG. 2, an exemplary circuitry 200 of a power path sub-controller 204 is illustrated. Power path sub-controller 204 may be connected to a power storage component 102 such as any power source and/or power storage components as described above with reference to FIG. 1. In an embodiment, processing circuit of power path sub-controller 104 may include an input port 208 where power or a control signal enters power path sub-controller 204.

With continued reference to FIG. 2, a shunt 212, as previously described with reference to FIG. 1, a low-resistance component used to monitor and measure current, may be connected in between power storage component 102 and power path sub-controller 204. Power source datums 114 such as, without limitation, "CH_Isns_NEG," "CH_Isns_POS," "CH_Volts" (equivalent to batteryi_voltage), and/or the like may be detected and further transmitted to DASM 126 for further processing e.g., source profile/power source selection.

Still referring to FIG. 2, additionally, or alternatively, shunt 212 may (passively) receive an input current (e.g., a charging input signal [CH_Chg_In] indicating a request to charge connected power source of power storage component 102). In a non-limiting example, this input current may come from source charger 108 as described above with reference to FIG. 1. Once the charging process begins, input current flows through the circuit may be measured by shunt 212. Voltage drops across shunt 212 may be used to measure such input current. Further, a 180K ohm resistor 216 may be used for biasing, filtering, or otherwise setting reference voltages.

With continued reference to FIG. 2, power path sub-controller 204 may include a source terminal 220 "SOURCE" i.e., a port on sub-controller 204 from which power is sourced to rest of circuit or system 100. Power path sub-controller 204 may include a control terminal 224 "GATE" for a plurality of MOSFETs 228. In a non-limiting example, voltage applied to "GATE" may determine whether MOSFETs 228 is on (conducting) or off (non-conducting). In some cases, plurality of MOSFETs 228 may include one or more P-Channel MOSFETs, one or more N-Channel MOSFETs, or combinations thereof. In an embodiment, control terminal 224 may serve as a control mechanism for the flow of current between "SOURCE" and "DRAIN" of plurality of MOSFETs. Further, power path sub-controller 204 may include an output port 232 "OUT" from wherein the controlled power exits power path-controller 204 to be delivered to OPMM 124 and/or external load 136 as described herein.

With continued reference to FIG. 2, power path sub-controller 204 may include a protection mechanism. In a non-limiting example, power path sub-controller 204 may include an under voltage port 236 "UV" and a signaling component 236 such as, without limitation, relay, transistor, and/or the like that may send an output signal from power path sub-controller 204. In a non-limiting example, when voltage drops below a certain threshold, "UV" detection may trigger a response 240 i.e., "UVOUT" to kill circuit 134 that cut off the power to protect power path sub-controller 204 and rest of system 100.

With continued reference to FIG. 2, power path sub-controller 204 may be connected to ground 244. Additionally, or alternatively, power path sub-controller 204 may be connected to an inverted power supply 248 "INVTcc" or a specific control voltage for the circuit. In some cases, the connection between power path sub-controller may include one or more capacitors 252 configured to store and release electrical energy. In a non-limiting example, one or more capacitors 252 may be used for filtering, voltage regulation, and/or smoothing out voltage fluctuations within system 100.

With continued reference to FIG. 2, power path sub-controller 204 may include one or more ideal diodes 256, for example, and without limitation, at least one power path controller may include an ideal diode array. In an embodiment, ideal diode 256 may have zero forward voltage drop; for instance, and without limitation, when diode 256 is forward-biased (i.e., conducting), it may have no voltage drop across it. In such an embodiment, ideal diode 256 may not consume any power or introduce any losses in circuit of system 100 when its conducting. In another embodiment, ideal diode 256 may include an infinite reverse breakdown voltage. This means that when diode 256 is reverse-biased (i.e., non-conducting), it may withstand any reverse voltage without breaking down or conducting in the reverse direction. In some cases, ideal diode 256 may be switch between conducting and non-conducting states instantaneously. Additionally, or alternatively, ideal diode's 252 may have zero current flow regardless of the voltage applied when the ideal diode 256 is off.

Still referring to FIG. 2, in a non-limiting example, ideal diodes 256 may be used in an "Or-ing" configuration, where at least two power storage components 102a-n are connected to a common external load 136. In some cases, ideal diodes 256 may ensure that power is drawn from appropriate source without any back-feed into other sources. Since ideal diodes 256 do not have a forward voltage drop, they may also be sued to ensure that power switching and routing as described herein happened without any significant losses. Unwanted current flow, in some cases, may be prevented in reverse direction, protecting system components by configuring power flow in the intended direction. In some cases, system 100 may include redundant power storage components i.e., power storage components having redundant power sources. Ideal diodes 256 may be used in load sharing, allowing the load is evenly distributed among available power sources. Further, ideal diodes 256 may be used in combination of real diodes, plurality of MOSFETs 228, control circuits, and/or the like to minimize drawbacks of real diodes e.g., forward voltage drop and switching times.

Figure 3:
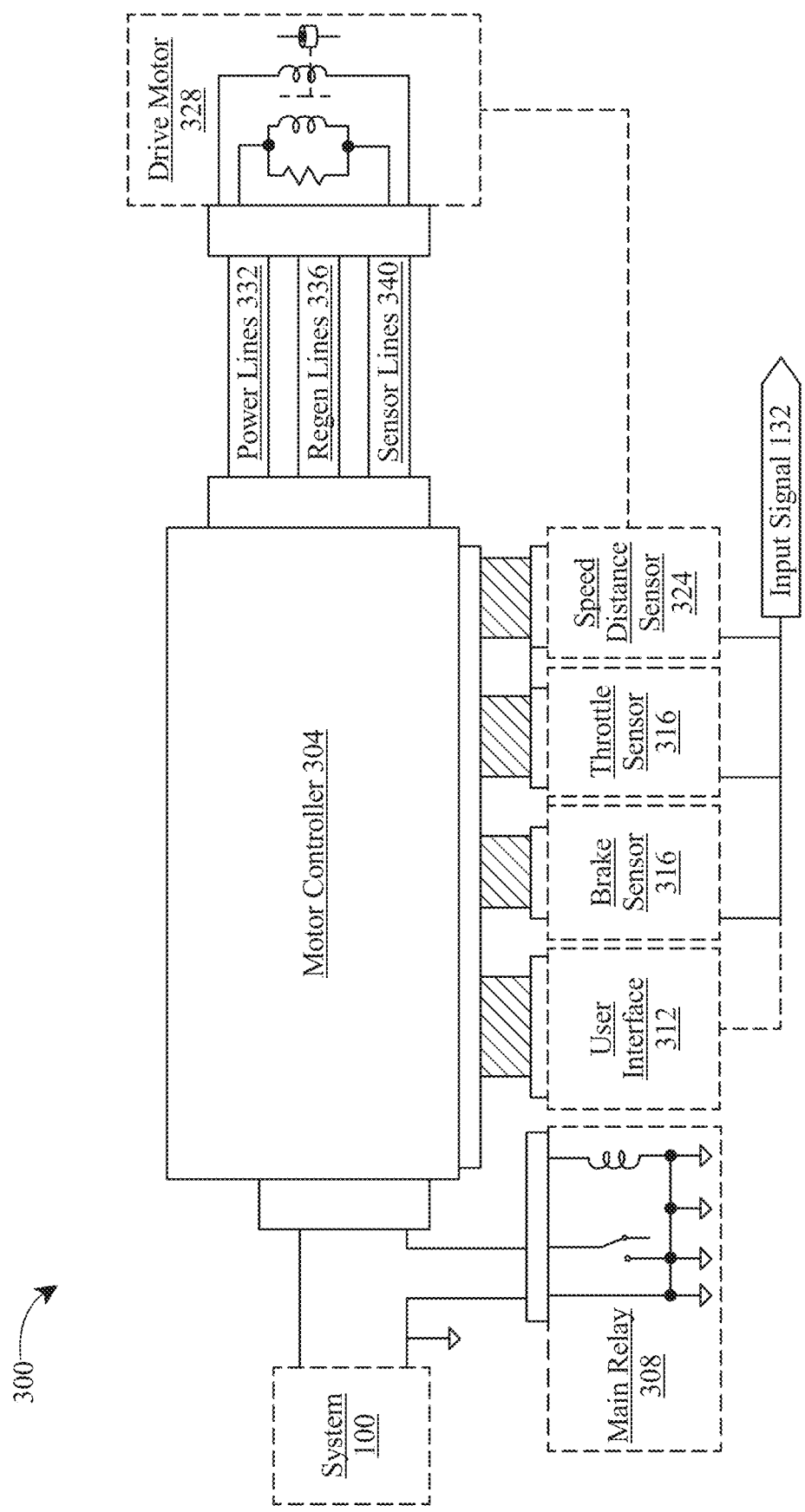
FIG. 3 is an exemplary embodiment of an external load.

Now referring to FIG. 3, an exemplary embodiment of an external load 300 is illustrated. External load 300 may include an electric motor used in electrical vehicles. In some cases, external load 300 may include a motor controller 304. As used in this disclosure, a "motor controller" is an electronic component responsible for regulating the power supplied to drive motor as described in detail below. In an embodiment, motor controller may include any processing circuit and/or computing devices as described herein. In a non-limiting example, motor controller 304 may interpret input signals from various sensors and/or user interfaces, adjusting the motor's operation accordingly. Motor controller 304 may manage the motor's speed, torque, direction, and/or the like. In some cases, motor controller 304 may interface directly with at least one power path controller 116, one or more power path sub-controllers 200, or otherwise indirectly via OPMM 124 as described above with reference to FIG. 1, receiving power from one or more power storage components based on the selected source profile(s) 106. Additionally, or alternatively, motor controller 304 may be configured to open a ground (GND) connection when the drive is disabled, ensuring safety, and preventing unintended motor operation.

With continued reference to FIG. 3, in some cases, external load 300 may include a main relay 308, i.e., a primary switch configured to control the flow of power to motor controller as described above. In a non-limiting example, main relay 308 may act as a gatekeeper, ensuring that power may only be supplied when required and cutting it off during idle periods or in any other emergency situations. In an embodiment, main relay may be configured to prevent drive motor from accidentally activating when not intended.

With continued reference to FIG. 3, external load 300 may also include one or more user interfaces 312, for example, and without limitation, one or more indicators, key switches, mode selectors, and/or the like. In some cases, user interfaces 312 may provide the rider or operator of electric vehicle with direct control over the motor's operation. In a non-limiting example, user interface 312 may include a plurality of indicators including a visual feedback on the system's status, such as, but not limited to, battery level, mode, and potential errors. In another non-limiting example, user interface 312 may include a key switch that serves as a primary on/off control, ensuring the motor doesn't operate without user intent. In a further non-limiting example, user interface 312 may include a mode selector configured to allow user to choose between different operational modes, e.g., "Eco Mode," "Sport Mode," "Regenerative Mode," "Manual Mode," "Traction Control Mode," "Hill Assist Mode," and/or the like.

Still referring to FIG. 3, one or more sensors e.g., brake sensor 316, throttle sensor 320, speed distance sensor 324, among others may be incorporated into external load 300 as described herein, configured to detect real-time feedback to motor controller 304. In some cases, brake sensor 316 may be configured to detect when the brakes are applied, signaling drive motor to decelerate or engage regenerative braking via regenerative mechanism as described above. In some cases, throttle sensor 320 may be configured to measure the user's acceleration intent, adjusting motor power accordingly. In other cases, speed distance sensor 324 may be configured to monitor a motor's speed and distance electric vehicle has traveled, providing data that may affect other system components, such as, without limitation, power source selection as described above with reference to FIG. 1.

With further referring to FIG. 3, external load 300 may include a drive motor 328, wherein the "drive motor," as described herein, refers to a component that converts electrical energy into mechanical motion, propelling the vehicle. In some cases, drive motor 328 may receive electrical power from motor controller 304 via dedicated power lines 332. In a non-limiting example, drive motor 328 may include a stator (i.e., a stationary part which contains coils that electricity flows through to generate a rotating magnetic field) and a rotor (i.e., a rotating part configured to turns, producing mechanical output that can be used to drive a mechanism or vehicle in response to the stator's magnetic field) attached to a shaft that extends out of drive motor 328 and connects to other loads or mechanisms drive motor 328 is driving. Additionally, or alternatively, regen lines 336 may be used to connect drive motor 328 to motor controller 304, facilitating regenerative braking, wherein the regenerative braking is a process where the external load 300 acts as a generator during deceleration, converting some of the kinetic energy back into electrical energy. Further, one or more sensor (lines) 340 may provide sensed datums on the motor's operational status which may be transmitted to motor controller 304 for reporting and/or related decision making process.

It should be noted that external load 300 described herein may include any device, system, or mechanism that utilizes electrical energy for its operation, such as, without limitation, motors, lighting systems, heating elements, electronic devices, machinery, and other energy-consuming appliances. The specific nature and requirements of the external load may vary widely based on the application and the context in which hybrid power system 100 is deployed. As an ordinary person skilled in the art, upon reviewing the entirety of this disclosure, will recognize that the configurations and embodiments presented herein may be adapted and modified to suit a variety of applications and operational scenarios, ensuring flexibility and adaptability in diverse real-world settings.

Figure 4:
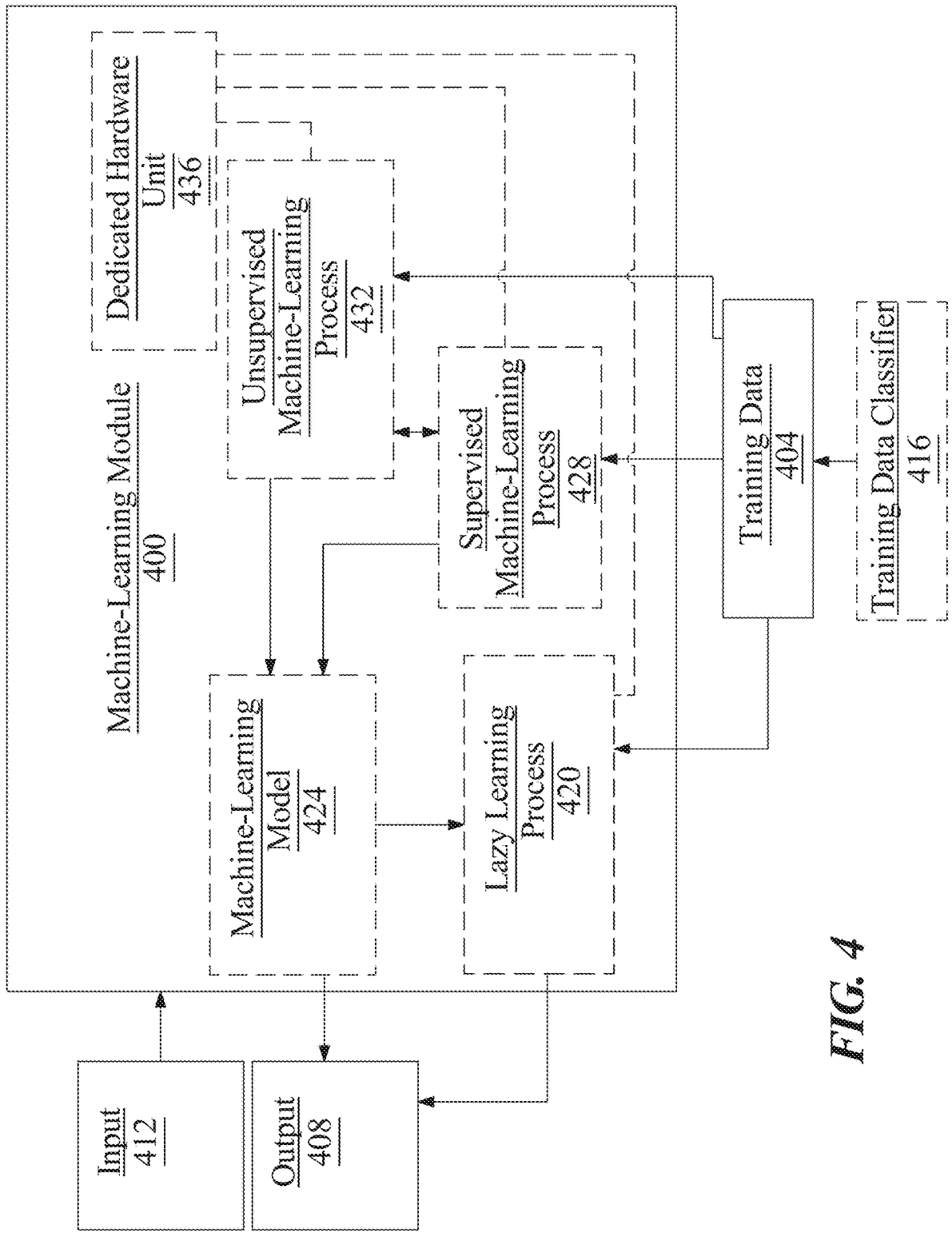
FIG. 4 is a block diagram of an exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example training data may include a plurality of input signals as input correlated to a plurality of source profiles as output.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 4, computing device 404 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 404 may then calculate a likelihood table by calculating probabilities of different data entries and classification labels. Computing device 404 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device 404 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$: l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitation may include utilizing algorithms for identifying duplicate entries or spell-check algorithms.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input signals as described above as inputs, source profiles as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
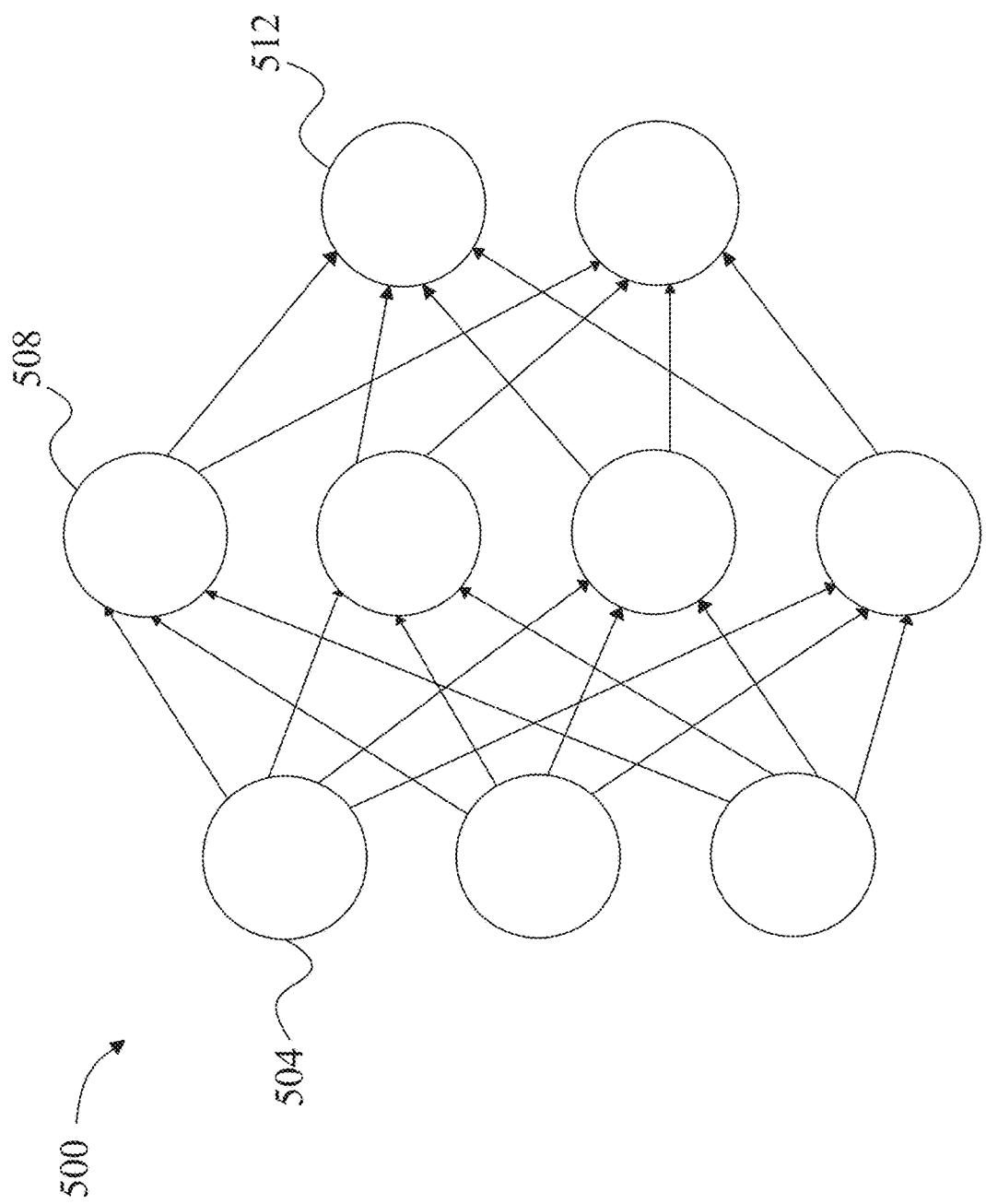
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. In a non-limiting embodiment, input layer of nodes 504 may include any remote display where user inputs may be provided from, while output layer of nodes 512 may include either the local device if it has the processing capability to support the requisite machine-learning processes, or output layer of nodes 412 may refer to a centralized, network connected processor able to remotely conduct the machine-learning processes described herein. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. Connections may run solely from input nodes toward output nodes in a "feed-forward" network or may feed outputs of one layer back to inputs of the same or a different layer in a "recurrent network."

Figure 6:
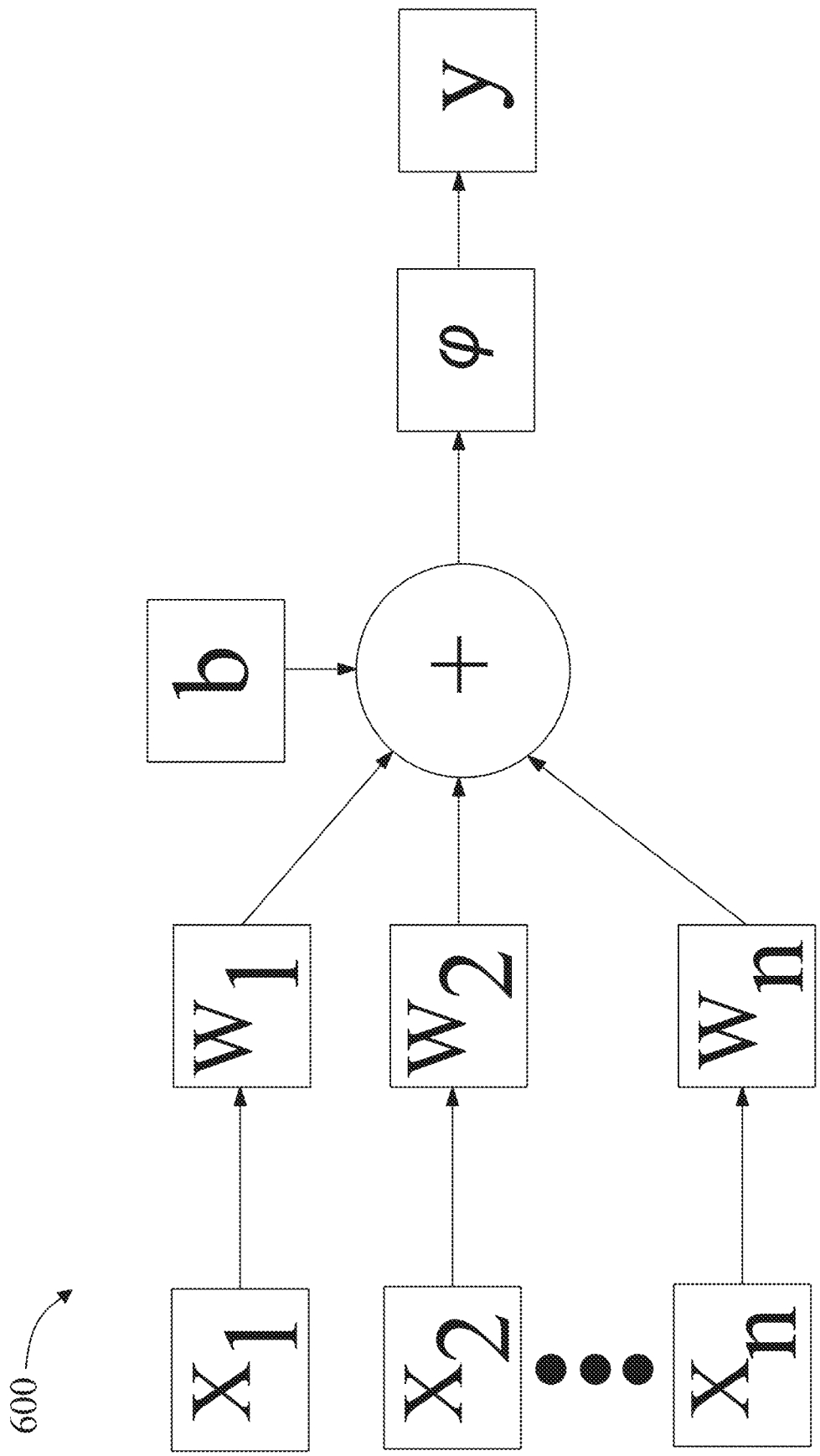
FIG. 6 is a block diagram of an exemplary embodiment of a node of a neural network.

Referring now to FIG. 6, an exemplary embodiment of a node 600 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
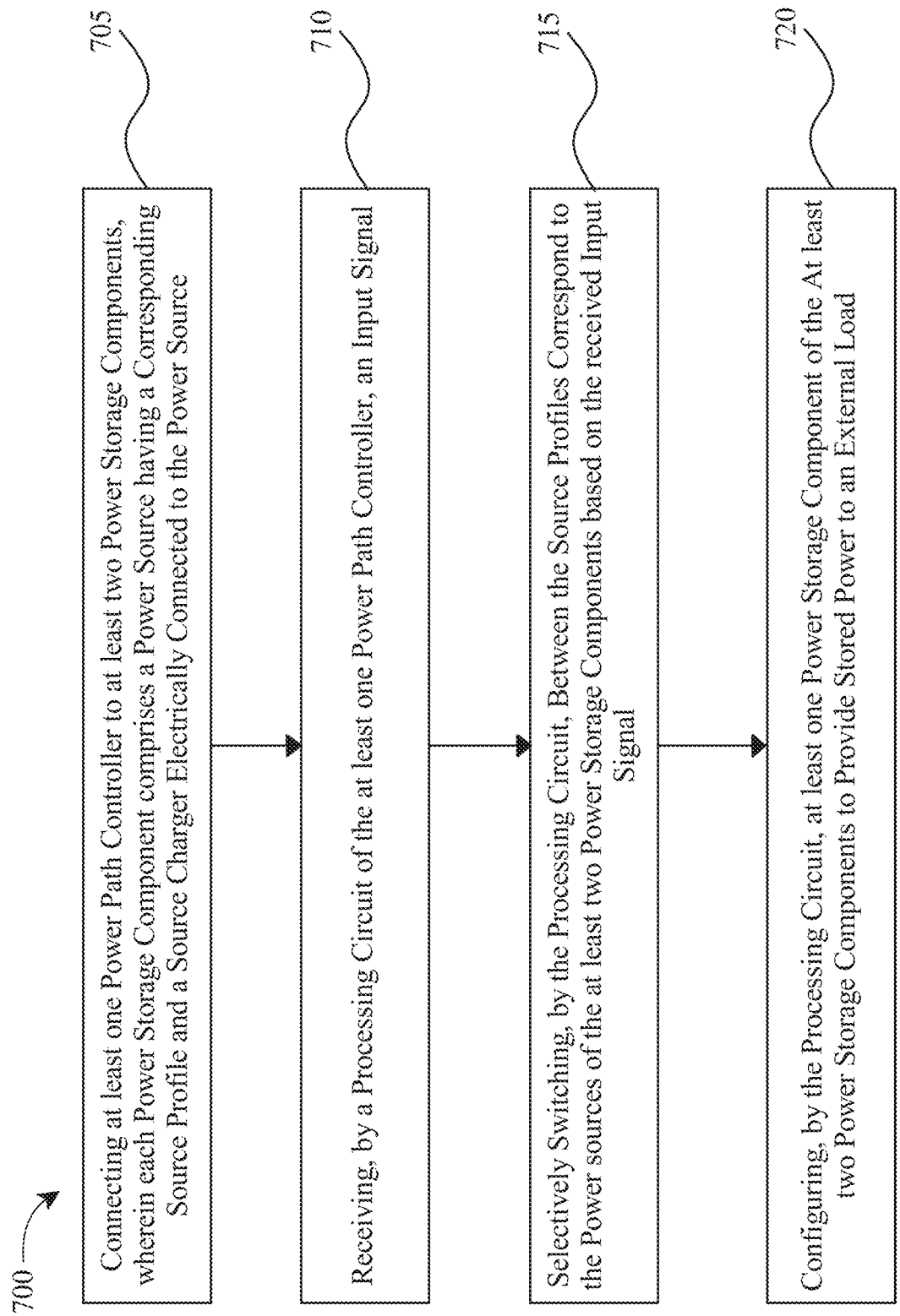
FIG. 7 is a flow diagram of an exemplary embodiment of a method use of a hybrid power system.

Now referring to FIG. 7, a flow diagram of an exemplary embodiment of method 700 of use of a hybrid power system is illustrated. Method 700 includes a step 705 of connecting at least one power path controller to at least two power storage components, wherein each power storage component includes a power source having a corresponding source profile and a source charger electrically connected to the power source. In some embodiments, the power source may include at least a battery selected from a group of batteries containing a lithium-ion phosphate battery, a lithium-titanate battery, and a supercapacitor. In some embodiments, the source profile may include a plurality of inherent properties of the corresponding power source. In other embodiments, the source profile may include at least one corresponding behavioral trait. In some cases, each power storage component may include a sensor device communicatively connected to the at least one power path controller configured to detect a power source datum. In some embodiments, the power source datum may include a state of charge (SOC) and a voltage level associated with the power source. This may be implemented, without limitation, as described above with reference to FIGS. 1-6.

With continued reference to FIG. 7, method 700 includes a step 710 of receiving, by a processing circuit of the at least one power path controller, an input signal. This may be implemented, without limitation, as described above with reference to FIGS. 1-6.

With continued reference to FIG. 7, method 700 includes a step 715 of selectively switching, by the processing circuit between the source profiles correspond to the power sources of the at least two power storage components based on the received input signal. In some embodiments, selectively switching between the source profiles may include identifying a suitable source profile as a function of the received input signal. This may be implemented, without limitation, as described above with reference to FIGS. 1-6.

With continued reference to FIG. 7, method 700 includes a step 720 of configuring, by the processing circuit, at least one power storage component of the at least two power storage components to provide stored power to an external load. This may be implemented, without limitation, as described above with reference to FIGS. 1-6.

With continued reference to FIG. 7, method 700 may also include a step of performing, by the processing circuit, a power source maintenance operation determined based on the detected power source datum. In some embodiments, the power source maintenance operation may include a cell balancing operation. This may be implemented, without limitation, as described above with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
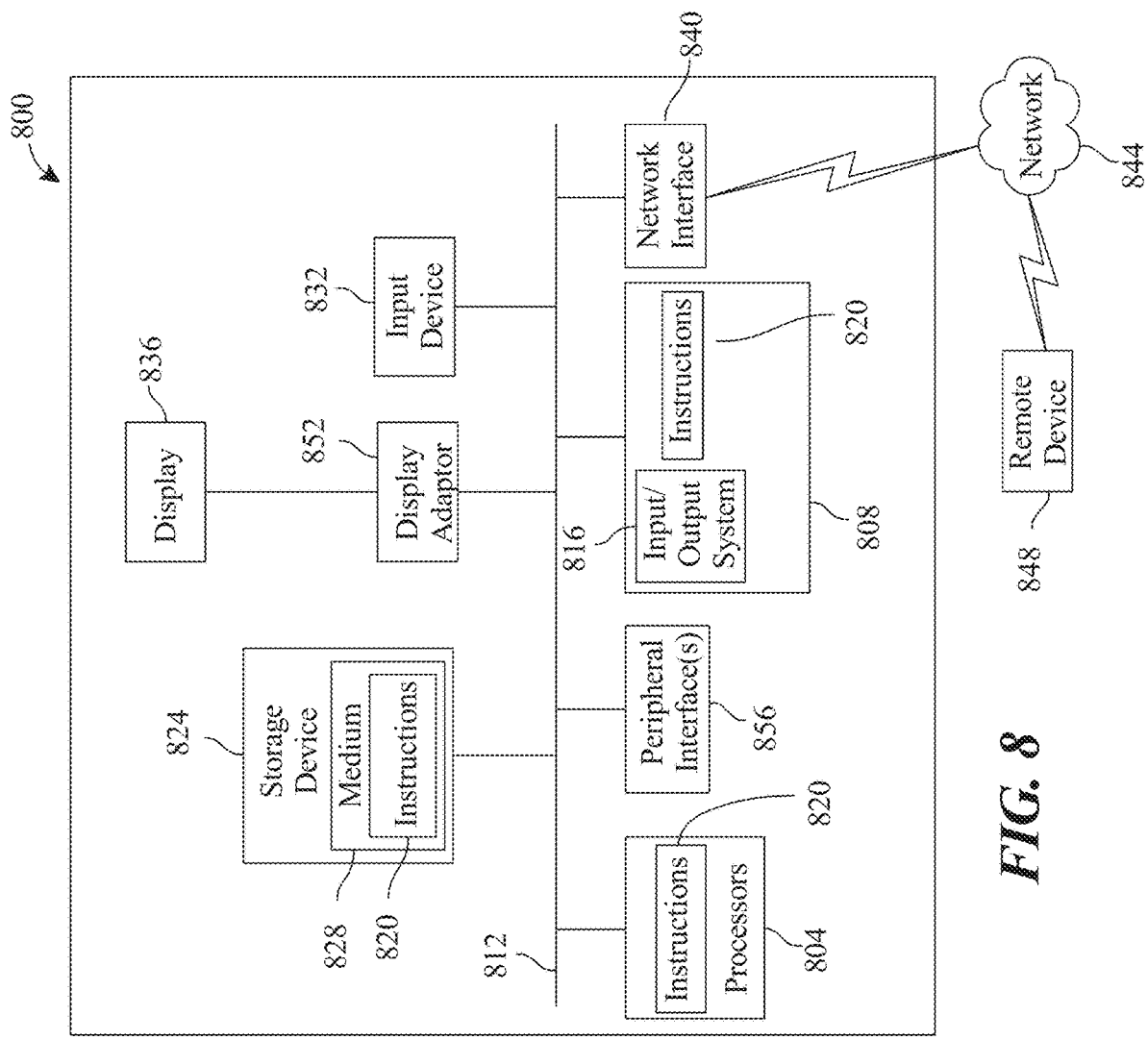
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A hybrid power system, wherein the hybrid power system comprises:
   at least two power storage components, wherein each power storage component of the at least two power storage components comprise:
      a power source having a corresponding source profile;
      a source charger electrically connected to the power source; and a sensor device communicatively connected to at least one power path controller and configured to detect a power source datum;
at least one battery management and balancing module, wherein the at least one battery management and balancing module is configured to implement cell balancing within the power source of each power storage component by regulating energy transfer between cells with high energy levels and cells with low energy levels of each power source; and
the at least one power path controller operatively connected to the at least two power storage components, wherein the at least one power path controller comprises a processing circuit configured to:
receive an input signal; and
selectively switch between the source profiles of the power sources of the at least two power storage components based on the received input signal, thereby configuring at least one power storage component of the at least two power storage components to provide stored power to an external load.

2. The hybrid power system of claim 1, wherein the power source comprises at least a battery selected from a group of batteries consisting of a lithium-ion phosphate battery, a lithium-titanate battery, and a supercapacitor.

3. The hybrid power system of claim 1, wherein each source profile comprises a plurality of inherent properties of the corresponding power source.

4. The hybrid power system of claim 1, wherein each source profile comprises at least one corresponding behavioral trait.

5. The hybrid power system of claim 1, wherein the power source datum comprises a state of charge (SOC) and a voltage level associated with each power source of at least two power storage components.

6. The hybrid power system of claim 1, wherein the at least one power path controller comprises an ideal diode array.

7. The hybrid power system of claim 1, wherein selectively switching between the source profiles comprises identifying a suitable source profile as a function of the received input signal.

8. The hybrid power system of claim 1, wherein the processing circuit of the at least one power path controller is further configured to:
perform a power source maintenance operation determined based on the detected power source datum.

9. The hybrid power system of claim 8, wherein the power source maintenance operation comprises a cell balancing operation.

10. A method of use of a hybrid power system, wherein method comprises:
connecting at least one power path controller to at least two power storage components, wherein each power storage component of the at least two power storage components comprise:
a power source having a corresponding source profile;
a source charger electrically connected to the power source; and
a sensor device communicatively connected to the at least one power path controller and configured to detect a power source datum;
implementing, by at least a battery management and balancing module, cell balancing within the power source of each storage component by regulating energy transfer between cells with high energy levels and cells with low energy levels of each power source;
receiving, by a processing circuit of the at least one power path controller, an input signal;
selectively switching, by the processing circuit, between the source profiles of the power sources of the at least two power storage components based on the received input signal; and
configuring, by the processing circuit, at least one power storage component of the at least two power storage components to provide stored power to an external load.

11. The method of claim 10, wherein the power source comprises at least a battery selected from a group of batteries consisting of a lithium-ion phosphate battery, a lithium-titanate battery, and a supercapacitor.

12. The method of claim 10, wherein each source profile comprises a plurality of inherent properties of the corresponding power source.

13. The method of claim 10, wherein each source profile comprises at least one corresponding behavioral trait.

14. The method of claim 10, wherein the power source datum comprises a state of charge (SOC) and a voltage level associated with each power source of at least two power storage components.

15. The method of claim 10, wherein the at least one power path controller comprises an ideal diode array.

16. The method of claim 10, wherein selectively switching between the source profiles comprises identifying a suitable source profile as a function of the received input signal.

17. The method of claim 10, wherein the method further comprises:
performing, by the processing circuit, a power source maintenance operation determined based on the detected power source datum.

18. The method of claim 17, wherein the power source maintenance operation comprises a cell balancing operation.

* * * * *